US008861655B1

(12) United States Patent
Al-Naffouri et al.

(10) Patent No.: US 8,861,655 B1
(45) Date of Patent: Oct. 14, 2014

(54) METHOD OF PERFORMING STRUCTURE-BASED BAYESIAN SPARSE SIGNAL RECONSTRUCTION

(71) Applicants: King Fahd University of Petroleum and Minerals, Dhahran (SA); King Abdulaziz City for Science and Technology, Riyadh (SA)

(72) Inventors: Tareq Y. Al-Naffouri, Dhahran (SA); Ahmed Abdul Quadeer, Karachi (PK)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/915,513

(22) Filed: Jun. 11, 2013

(51) Int. Cl.
*H04L 27/06* (2006.01)
*H04L 1/00* (2006.01)

(52) U.S. Cl.
CPC .................................. *H04L 1/0054* (2013.01)
USPC .......................................... 375/341; 375/343

(58) Field of Classification Search
USPC ......................................... 375/340, 341, 343
See application file for complete search history.

(56) References Cited

U.S. PATENT DOCUMENTS

| | | | |
|---|---|---|---|
| 5,539,704 A | 7/1996 | Doyen et al. | |
| 7,269,241 B2 | 9/2007 | Siltanen et al. | |
| 7,378,660 B2 | 5/2008 | Case et al. | |
| 7,809,155 B2 | 10/2010 | Nestares et al. | |
| 8,204,715 B1 | 6/2012 | Gendron et al. | |
| 8,274,054 B2 | 9/2012 | Pratx et al. | |
| 2007/0206880 A1 | 9/2007 | Chen et al. | |
| 2008/0129560 A1* | 6/2008 | Baraniuk et al. | 341/87 |
| 2010/0246920 A1* | 9/2010 | Vaswani | 382/131 |
| 2012/0224498 A1 | 9/2012 | Abrishamkar et al. | |
| 2012/0249353 A1* | 10/2012 | Khajehnejad et al. | 341/144 |

FOREIGN PATENT DOCUMENTS

| WO | WO 2012037067 A1 | 3/2012 |
|---|---|---|
| WO | WO 2012122037 A1 | 9/2012 |

OTHER PUBLICATIONS

X. Tan and J. Li, "Computationally Efficient Sparse Bayesian Learning via Belief Propagation", Signal Processing, IEEE Transactions on, vol. 58, Issue 4, pp. 2010-2021, Apr. 2010.

A.A. Quadeer, S.F. Ahmed and T.Y. Al-Naffouri, "Structure based Bayesian sparse reconstruction using non-Gaussian prior", Communication, Control, and Computing (Allerton), 2011 49th Annual Allerton Conference on, Sep. 28-30, 2011, pp. 277-283.

Mudassir Masood and Tareq Al-Naffouri, "A Fast Non-Gaussian Bayesian Matching Pursuit Method for Sparse Reconstruction", published on arXiv.org on Jun. 19, 2012.

* cited by examiner

*Primary Examiner* — Don N Vo
(74) *Attorney, Agent, or Firm* — Richard C. Litman

(57) ABSTRACT

The method of performing structure-based Bayesian sparse signal reconstruction is a Bayesian approach to sparse signal recovery that has relatively low complexity and makes a collective use of: a priori statistical properties of the signal and noise; sparsity information; and the rich structure of the sensing matrix $\Psi$. The method is used with both Gaussian and non-Gaussian (or unknown) priors, and performance measures of the ultimate estimate outputs are easily calculated.

10 Claims, 12 Drawing Sheets

METHOD OF PERFORMING STRUCTURE-BASED BAYESIAN SPARSE SIGNAL RECONSTRUCTION

BACKGROUND OF THE INVENTION

1. Field of the Invention

The present invention relates to signal processing techniques, and particularly to a method of performing structure-based Bayesian sparse signal reconstruction.

2. Description of the Related Art

Compressive Sensing/Compressed Sampling (CS) is a fairly new field of research that is finding many applications in statistics and signal processing. As its name suggests, CS attempts to acquire a signal (inherently sparse in some subspace) at a compressed rate by randomly projecting it onto a subspace that is much smaller than the dimension of the signal itself. Provided that the sensing matrix satisfies a few conditions, the sparsity pattern of such a signal can be recovered non-combinatorially with high probability. This is in direct contrast to the traditional approach of sampling signals according to the Nyquist theorem and then discarding the insignificant samples.

Generally, most naturally occurring signals are sparse in some basis/domain, and therefore CS can be utilized for their reconstruction. CS has been used successfully in, for example, peak-to-average power ratio reduction in orthogonal frequency division multiplexing (OFDM), image processing, impulse noise estimation and cancellation in power-line communication and digital subscriber lines (DSL), magnetic resonance imaging (MRI), channel estimation in communications systems, ultra-wideband (UWB) channel estimation, direction-of-arrival (DOA) estimation, and radar design.

The CS problem can be described as follows. Let $x \in C^N$ be a P-sparse signal (i.e., a signal that consists of P non-zero coefficients in an N-dimensional space with P<<N) in some domain, and let $y \in C^M$ be the observation vector with M<<N given by:

$$y = \Psi x + n, \quad (1)$$

where $\Psi$ is an M×N measurement/sensing matrix that is assumed to be incoherent with the domain in which x is sparse, and n is complex additive white Gaussian noise, $CN(0, \sigma_n^2 I_m)$. As M<<N, this is an ill-posed problem as there is an infinite number of solutions for x satisfying equation (1). If it is known a priori that x is sparse, the theoretical way to reconstruct the signal is to solve an $l_0$-norm minimization problem using only M=2P measurements when the signal and measurements are free of noise:

$$x = \min_x \|x\|_0 \text{ subject to } y = \Psi x. \quad (2)$$

Unfortunately, solving the $l_0$-norm minimization problem is NP-hard, and is therefore not practical. Thus, different sub-optimal approaches, categorized as compressive sensing, have been developed to solve this problem. It has been shown that x can be reconstructed with high probability in polynomial time by using convex relaxation approaches, at the cost of an increase in the required number of measurements. This is performed by solving a relaxed $l_1$-norm minimization problem using linear programming instead of $l_0$-norm minimization:

$$x = \min_x \|x\|_1 \text{ subject to } \|y - \Psi x\|_2 \leq \varepsilon, \quad (3)$$

where $$\varepsilon = \sqrt{\sigma_n^2(M + \sqrt{2M})}.$$

For $l_1$-norm minimization to reconstruct the sparse signal accurately, the sensing matrix $\Psi$ should be sufficiently incoherent. In other words, the coherence, defined as $\mu(\Psi) \triangleq \max_{i \neq j} |\langle \Psi_i, \Psi_j \rangle|$, should be as small as possible (with $\mu(\Psi)=1$ depicting the worst case). It has been shown that these convex relaxation approaches have a Bayesian rendition and may be viewed as maximizing the maximum a posteriori estimate of x, given that x has a Laplacian distribution. Although convex relaxation approaches are able to recover sparse signals by solving under-determined systems of equations, they also suffer from a number of drawbacks, as discussed below.

Convex relaxation relies on linear programming to solve the convex $l_1$-norm minimization problem, which is computationally relatively complex (its complexity is of the order $0(M^2 N^{3/2})$ when interior point methods are used. This approach can, therefore, not be used in problems with very large dimensions. To overcome this drawback, many "greedy" algorithms have been proposed that recover the sparse signal iteratively. These include Orthogonal Matching Pursuit (OMP), Regularized Orthogonal Matching Pursuit (ROMP), Stagewise Orthogonal Matching Pursuit (StOMP), and Compressive Sampling Matching Pursuit (CoSamp). These greedy approaches are relatively faster than their convex relaxation counterparts (approximately 0(MNR), where R is the number of iterations).

Convex relaxation methods cannot make use of the structure exhibited by the sensing matrix (e.g., a structure that comes from a Toeplitz sensing matrix or that of a partial discrete Fourier transform (DFT) matrix). In fact, if anything, this structure is harmful to these methods, as the best results are obtained when the sensing matrix is close to random. This is in contrast to current digital signal processing architectures that only deal with uniform sampling. Obviously, more feasible and standard sub-sampling approaches would be desirable.

Convex relaxation methods are further not able to take account of any a priori statistical information (apart from sparsity information) about the signal support and additive noise. Any a priori statistical information can be used on the result obtained from the convex relaxation method to refine both the signal support obtained and the resulting estimate through a hypothesis testing approach. However, this is only useful if these approaches are indeed able to recover the signal support. In other words, performance is bottle-necked by the support-recovering capability of these approaches. It should be noted that the use of a priori statistical information for sparse signal recovery has been studied in a Bayesian context, and in algorithms based on belief propagation, although the former uses a priori statistical information (assuming x to be mixed Bernoulli-Gaussian), and only the latter uses this information in a recursive manner to obtain a fast sparse signal recovery algorithm. However, it is not clear how these approaches can be extended to the non-Gaussian case.

It is difficult to quantify the performance of convex relaxation estimates analytically in terms of the mean squared error (MSE) or bias, or to relate these estimates to those obtained through more conventional approaches, e.g., maximum a posteriori probability (MAP), minimum mean-square error (MMSE), or maximum likelihood (ML). It should be noted that convex relaxation approaches have their merits, in that they are agnostic to the signal distribution and thus can be quite useful when worst-case analysis is desired, as opposed to average-case analysis.

In general, convex relaxation approaches do not exhibit the customary tradeoff between increased computational complexity and improved recovery, as is the case for, as an example, iterative decoding, or joint channel and data detection. Rather, they solve some $l_1$ problem using (second-order cone programming) with a set complexity. Some research has been directed towards attempting to derive sharp thresholds for support recovery. In other words, the only degree of freedom available for the designer to improve performance is to increase the number of measurements. Several iterative implementations of convex relaxation approaches provide some sort of flexibility by trading performance for complexity.

It should be noted that in the above, and in what follows, scalars are identified with lower-case letters (e.g., x), vectors are identified with lower-case bold-faced letters (e.g., x), matrices are represented by upper-case, bold-faced letters (e.g., X), and sets are identified with script notation (e.g. S). The format of $x_i$ is used to denote the $i^{th}$ column of matrix X, x(j) denotes the $j^{th}$ entry of vector x, and $S_i$ denotes a subset of a set S. $X_S$ is used to denote the sub-matrix formed by the columns $\{x_i: i \in S\}$, indexed by the set S. Finally, x, x*, $x^T$, and $x^H$ are used to denote the estimate, conjugate, transpose, and conjugate transpose, respectively, of a vector x.

The signal model is of particular interest, particularly in regard to equation (1). Here, the vector x is modelled as $x=x_B \odot x_G$, where $\odot$ denotes the Hadamard (element-by-element) multiplication. The entries of $x_B$ are independent and identically distributed Bernoulli random variables and the entries of $x_G$ are drawn identically and independently from some zero mean distribution. In other words, it is assumed that $x_B(i)$ are Bernoulli with success probability p, and similarly, that the $x_G(i)$ are independent and identically distributed (i.i.d.) variables with marginal probability distribution function f(x). The noise n is assumed to be complex circularly symmetric Gaussian, i.e., n~CN(0, $\sigma_n^2 I_M$). When the support set S of x is known, equation (1) can be equivalently expressed as:

$$y = \Psi_S x_S + n. \quad (4)$$

The ultimate objective is to obtain the optimum estimate of x given the observation y. Either an MMSE or a MAP approach may be used to achieve this goal. The MMSE estimate of x given the observation y can be expressed as:

$$\hat{x}_{MMSE} = E[x|y] = \Sigma_S p(S|y) E[x|y,S] \quad (5)$$

where the sum is over all the possible support sets S of x. The likelihood and expectation involved in equation (5) are evaluated below.

With regard to the evaluation of $E[x|y, S]$, we note that the relationship between y and x is linear. Thus, in the case where x conditioned on its support is Gaussian, $E[x|y, S]$ is simply the linear MMSE estimate of x given y (and S), i.e.:

$$E[x_S|y] \triangleq E[x|y,S] = \sigma_x^2 \Psi_S^H \Sigma_S^{-1} y, \quad (6)$$

where $$\Sigma_S = \frac{1}{\sigma_n^2} E[yy^H|S] = I_M + \frac{\sigma_x^2}{\sigma_n^2} \Psi_S \Psi_S^H. \quad (7)$$

When x|S is non-Gaussian or when its statistics are unknown, the expectation $E[x|y, S]$ is difficult or even impossible to calculate. Thus, it may be replaced by the best linear unbiased estimate (BLUE), i.e.:

$$E[x_S|y] = (\Psi_S^H \Psi_S)^{-1} \Psi_S^H y. \quad (8)$$

With regard to the evaluation of p(S|y), using Bayes' rule, p(S|y) may be rewritten as:

$$p(S|y) = \frac{p(y|S)p(S)}{\Sigma_S p(y|S)p(S)}. \quad (9)$$

As the denominator $\Sigma_S p(y|S)p(S)$ is common to all posterior likelihoods, p(S|y), it is a normalizing constant that can be ignored. To evaluate p(S), it should be noted that the elements of x are active according to a Bernoulli process with success probability p. Thus, p(S) is given by:

$$p(S) = p^{|S|}(1-p)^{N-|S|}. \quad (10)$$

What remains is the evaluation p(y|S), distinguishing between the cases of whether or not x|S is Gaussian. When x|S is Gaussian, y is also Gaussian, with zero mean and covariance $\Sigma_S$. The likelihood function may be written as:

$$p(y|S) = \frac{\exp\left(-\frac{1}{\sigma_n^2} \|y\|_{\Sigma_S^{-1}}^2\right)}{\det(\Sigma_S)} \quad (11)$$

up to an irrelevant constant multiplicative factor, $(1/\pi^M)$, where $\|b\|_A^2 \triangleq b^H A b$.

When x|S is non-Gaussian or unknown, then alternatively, we may treat x as a random vector of unknown (non-Gaussian) distribution, with support S. Therefore, given the support S, all that can be said about y is that it is formed by a vector in the subspace spanned by the columns of $\Psi_S$, plus a white Gaussian noise vector, n. It is difficult to quantify the distribution of y, even if we know the distribution of (the non-Gaussian) x. One way around this is to annihilate the non-Gaussian component and retain the Gaussian one. This is performed by projecting y onto the orthogonal complement of the span of the columns of $\Psi_S$, i.e., multiplying y by $P_S^\perp = I - \Psi_S(\Psi_S^H \Psi_S)^{-1} \Psi_S^H$. This leaves $P_S^\perp y = P_S^\perp n$, which is zero mean and with covariance $P_S^\perp \sigma_n^2 P_S^{\perp H} = \sigma_n^2 P_S^\perp$. Thus, the conditional density of y given S is approximately given by $$p(y|S) \simeq \exp\left(-\frac{1}{\sigma_n^2} \|P_S^\perp y\|^2\right). \quad (12)$$

To obtain the MAP estimate of x, the MAP estimate of S must first be determined, which is given by $$\hat{S}_{MAP} = \arg\max_{S} p(y \mid S) p(S). \quad (13)$$

The prior likelihood p(y|S) is given by equation (11) when x|S is Gaussian and by equation (12) when x|S is non-Gaussian or unknown, whereas p(S) is evaluated using equation (10). The maximization is performed over all possible $2^N$ support sets. The corresponding MAP estimate of x is given by $$\hat{x}_{MAP} = E\ [x|y,\ S_{MAP}]. \quad (14)$$

One can easily see that the MAP estimate is a special case of the MMSE estimate in which the sum of equation (5) is reduced to one term. As a result, we are ultimately interested in MMSE estimation.

Having evaluated the posterior probability and expectation, it remains to evaluate this over $2^N$ possible supports (see equation (5) and equation (13)), which is a computationally daunting task. This is compounded by the fact that the calculations required for each support set in S are relatively expensive, requiring some form of matrix multiplication/inversion as can be seen from equations (6)-(12). One way around this exhaustive approach is somehow to guess at a superset $S_r$ consisting of the most probable support, and then limit the sum in equation (5) to the superset $S_r$ and its subsets, reducing the evaluation space to $2^{|S_r|}$ points. There are two techniques that aid in guessing at such a set $S_r$: convex relaxation and the Fast Bayesian Maching Pursuit (FBMP).

In convex relaxation, starting from equation (1), standard convex relaxation tools may be used to find the most probable support set $S_r$ of the sparse vector x. This is performed by solving equation (3) and retaining some largest P non-zero values, where P is selected such that $P(\|S\|_0 > P)$ is very small. As $\|S\|_0$ is a binomial distribution $\sim B(N, p)$, it can be approximated by a Gaussian distribution $\sim N(Np, Np(1-p))$, when $Np>5$ (the DeMoivre-Laplace approximation). In this case, $$P(\|S\|_0 > P) = \frac{1}{2} \mathrm{erfc}\left( \frac{P - N(1-p)}{\sqrt{(2Np(1-p))}} \right).$$

FBMP is a fast Bayesian recursive algorithm that determines the dominant support and the corresponding MMSE estimate of the sparse vector. It should be noted that FBMP applies to the Bernoulli Gaussian case only. FBMP uses a greedy tree search over all combinations in pursuit of the dominant supports. The algorithm starts with zero active element support set. At each step, an active element is added that maximizes the Gaussian log-likelihood function similar to equation (11). This procedure is repeated until P active elements in a branch are reached. The procedure creates D such branches, which represent a tradeoff between performance and complexity. Though other greedy algorithms can also be used, FBMP is focused on here as it utilizes a priori statistical information along with sparsity information.

The above applies irrespective of the type of the sensing matrix $\Psi$. However, in many applications in signal processing and communications, the sensing matrix is highly structured. It would be desirable to take advantage of this in order to evaluate the MMSE (MAP) estimate at a much lower complexity than is currently available.

In most CS applications, the sensing matrix $\Psi$ is assumed to be drawn from a random constellation, and in many signal processing and communications applications, this matrix is highly structured. Thus, $\Psi$ could be a partial discrete Fourier transform (DFT) matrix or a Toeplitz matrix (encountered in many convolution applications). Table 1 below lists various possibilities of structured $\Psi$:

TABLE 1

Applications of Structured Sensing Matrices

| Matrix $\Psi$ | Application |
| --- | --- |
| Partial DFT | OFDM applications including peak-to-average power ratio reduction, narrow-band interference cancelation and impulsive noise estimation and mitigation in DSL |
| Toeplitz | Channel estimation, UWB and DOA estimation |
| Hankel | Wide-band spectrum sensing |
| DCT | Image compression |
| Structured Binary | Multi-user detection and contention resolution and feedback reduction |

Since $\Psi$ is a "fat" matrix (M<<N), its columns are not orthogonal (in fact, they are not even linearly independent). However, in the aforementioned applications, one can usually find an orthogonal subset of the columns of $\Psi$ that span the column space of $\Psi$. These columns may be collected into a square matrix $\Psi_M$. The remaining (N–M) columns of $\Psi$ group around these orthogonal columns to form semi-orthogonal clusters. In general, the columns of $\Psi$ can be rearranged such that the farther two columns are from each other, the lower their correlation is. Below, it will be seen how semi-orthogonality helps to evaluate the MMSE estimate in a "divide-and-conquer" manner. Prior to this, it will first be demonstrated that the DFT and Toeplitz/Hankel sensing matrices exhibit semi-orthogonality.

For a partial DFT matrix, $\Psi = SF_N$, where $F_N$ denotes the N×N unitary DFT matrix, $[F_N]_{a,b} = (1/\sqrt{N})e^{-j2\pi a,b/N}$ with a, b $\in \{0, 1, \ldots, N-1\}$ and S is an M×N selection matrix consisting of zeros with exactly one entry equal to 1 per row. To enforce the desired semi-orthogonal structure, the matrix S usually takes the form $S = [0_{M\times Z}\ I_{M\times M}\ O_{M\times(N-Z-M)}]$, for some integer Z. In other words, the sensing matrix consists of a continuous band of sensing frequencies. This is not unusual, since in many OFDM problems, the band of interest (or the one free of transmission) is continuous. In this case, the correlation between two columns can be shown to be $$\psi_k^H \psi_{k'} = \begin{cases} 1, & (k = k') \\ \left| \frac{\sin(\pi(k-k')M/N)}{M\sin(\pi(k-k')/N)} \right|, & (k \neq k') \end{cases} \quad (15)$$

which is a function of the difference, (k–k') mod N. It thus suffices to consider the correlation of one column with the remaining ones. It should be noted that the matrix $\Psi$ exhibits other structural properties (e.g., the fact that it is a Vandermonde matrix), which helps to reduce the complexity of MMSE estimation.

For the Toeplitz case, which can be easily extended to the Hankel case, a sub-sampled convolutional linear system can be written in the following matrix form, y=$\Psi$x+n, where y is a vector of length M, x is a vector of length N and $\Psi$ is the M×N block Toeplitz/diagonal matrix:

$$\Psi = \begin{bmatrix} \Theta & 0 & \cdots & 0 \\ 0 & \Theta & \cdots & 0 \\ \vdots & \ddots & \ddots & \vdots \\ 0 & 0 & \cdots & \Theta \end{bmatrix},$$

where the size of $\Theta$ depends on the sub-sampling ratio. Here, $\Psi_k^H \Psi_{k'} = 0$ for $|k-k'| > L$, and thus the columns of $\Psi$ can easily be grouped into truly orthogonal clusters. It should be noted that the individual columns of $\Theta$ are related to each other by a shift property.

In order to use orthogonality for MMSE estimation, we let S be a possible support of x. The columns of $\Psi_S$ in equation (4) can be grouped into a maximum of C semi-orthogonal clusters, i.e., $\Psi_S = [\Psi_{S_1} \Psi_{S_2} \ldots \Psi_{S_C}]$, where $S_i$ is the support set corresponding to the $i^{th}$ cluster (with $i=1,2,\ldots C$). Based on this fact, equation (4) can be written as:

$$y = [\Psi_{S_1} \ \Psi_{S_2} \ \ldots \ \Psi_{S_C}] \begin{bmatrix} x_1 \\ x_2 \\ \vdots \\ x_C \end{bmatrix} + n. \quad (16)$$

Columns indexed by these sets should be semi-orthogonal, i.e., $\Psi_{S_i}^H \Psi_{S_j} \simeq 0$; otherwise, $S_i$ and $S_j$ are merged into a bigger superset. Thus, the MMSE estimate of x simplifies to:

$$x_{MMSE} = \sum_{Z \subset \cup S_i} p(Z|y) \mathbb{E}[x|y,Z]. \quad (17)$$

In order to see that $x_{MMSE}$ can be evaluated in a "divide-and-conquer" manner by treating each cluster independently, it must first be shown how orthogonality manifests itself in the calculation of the expectation and likelihood. Up to a constant factor, the likelihood can be written as $p(Z|y) = p(y|Z)p(Z)$. Thus:

$$\begin{aligned} p(Z) &= p\left(\bigcup Z_i\right) \\ &= p^{|\cup Z_i|}(1-p)^{N-|\cup Z_i|} \\ &= p^{|Z_1|+|Z_2|+\ldots+|Z_C|}(1-p)^{N-(|Z_1|+|Z_2|+\ldots+|Z_C|)} \\ &= p(Z_1)p(Z_2)\ldots p(Z_C) \end{aligned} \quad (18)$$

where the equality in equation (18) is true up to some constant factor. To evaluate $p(y|Z)$, we distinguish between the Gaussian and non-Gaussian cases. For brevity, focus is given to the Gaussian case and then these results are extrapolated to the non-Gaussian case. We know that $$p(y|Z) = \frac{\exp\left(-\frac{1}{\sigma_n^2}\|y\|_{\Sigma_Z^{-1}}^2\right)}{\det(\Sigma_Z)}, \quad (19)$$

with $\sum_Z = I_M + \frac{\sigma_x^2}{\sigma_n^2}\Psi_Z \Psi_Z^H$.

Here, $\Psi_Z = [\Psi_{Z_1} \ \Psi_{Z'}]$, where:

$\Psi_{Z'} = [\Psi_{Z_2} \ \Psi_{Z_3} \ \ldots \ \Psi_{Z_C}]$.

Using the matrix inversion lemma, $\Sigma_Z^{-1}$ may be written as:

$$\begin{aligned} \sum_Z^{-1} &= \left(I_M + \frac{\sigma_x^2}{\sigma_n^2}\Psi_Z \Psi_Z^H\right)^{-1} \\ &= \left(I_M + \frac{\sigma_x^2}{\sigma_n^2}\Psi_{Z_1}\Psi_{Z_1}^H + \frac{\sigma_x^2}{\sigma_n^2}\Psi_{Z'}\Psi_{Z'}^H\right)^{-1} \\ &= \sum_{Z_1}^{-1} - \frac{\sigma_x^2}{\sigma_n^2}\sum_{Z_1}^{-1}\Psi_{Z'}\left(I_{Z'} + \frac{\sigma_x^2}{\sigma_n^2}\Psi_{Z'}^H \sum_{Z_1}^{-1}\Psi_{Z'}\right)^{-1} \\ &\quad \Psi_{Z'}^H \sum_{Z_1}^{-1} \end{aligned} \quad (20)$$

where $$\sum_{Z_1} = I_M + \frac{\sigma_x^2}{\sigma_n^2}\Psi_{Z_1}\Psi_{Z_1}^H.$$

As $\Psi_{Z_1}$ and $\Psi_{Z'}$ are almost orthogonal (i.e., $\Psi_{Z_1}^H \Psi_{Z'} = \Psi_{Z'}^H \Psi_{Z_1} \simeq 0$), equation (20) becomes:

$$\begin{aligned} \sum_Z^{-1} &= I_M - \frac{\sigma_x^2}{\sigma_n^2}\Psi_{Z_1}\left(I_{Z_1} + \frac{\sigma_x^2}{\sigma_n^2}\Psi_{Z_1}^H \Psi_{Z_1}\right)^{-1}\Psi_{Z_1}^H - \\ &\quad \frac{\sigma_x^2}{\sigma_n^2}\Psi_{Z'}\left(I_{Z'} + \frac{\sigma_x^2}{\sigma_n^2}\Psi_{Z'}^H \Psi_{Z'}\right)^{-1}\Psi_{Z'}^H \\ &= -I_M + \left(I_M - \frac{\sigma_x^2}{\sigma_n^2}\Psi_{Z_1}\left(I_{Z_1} + \frac{\sigma_x^2}{\sigma_n^2}\Psi_{Z_1}^H \Psi_{Z_1}\right)^{-1}\Psi_{Z_1}^H\right) + \\ &\quad \left(I_M - \frac{\sigma_x^2}{\sigma_n^2}\Psi_{Z'}\left(I_{Z'} + \frac{\sigma_x^2}{\sigma_n^2}\Psi_{Z'}^H \Psi_{Z'}\right)^{-1}\Psi_{Z'}^H\right) \\ &\simeq -I_M + \left(I_M + \frac{\sigma_x^2}{\sigma_n^2}\Psi_{Z_1}\Psi_{Z_1}^H\right)^{-1} + \left(I_M + \frac{\sigma_x^2}{\sigma_n^2}\Psi_{Z'}\Psi_{Z'}^H\right)^{-1}. \end{aligned} \quad (21)$$

Continuing in the same manner, it is easy to show that:

$$\sum_Z^{-1} \simeq -(C-1)I_M + \sum_{i=1}^{C}\left(I_M + \frac{\sigma_x^2}{\sigma_n^2}\Psi_{Z_i}\Psi_{Z_i}^H\right)^{-1}. \quad (22)$$

Thus, we can write:

$$\exp\left(-\frac{1}{\sigma_n^2}\|y\|_{\Sigma_Z^{-1}}^2\right) \simeq \exp\left(\frac{C-1}{\sigma_n^2}\|y\|^2\right)\prod_{i=1}^{C}\exp\left(-\frac{1}{\sigma_n^2}\|y\|_{\Sigma_{Z_i}^{-1}}^2\right) \quad (23)$$

where $$\sum_Z^{-1} = I_M + \frac{\sigma_x^2}{\sigma_n^2}\Psi_{Z_i}\Psi_{Z_i}^H.$$

Using a similar procedure, we can decompose $\det(\Sigma_Z)$ as:

$$\det(\sum_Z) = \det\left(I_M + \frac{\sigma_x^2}{\sigma_n^2}\Psi_{Z_1}\Psi_{Z_1}^H + \frac{\sigma_x^2}{\sigma_n^2}\Psi_{Z'}\Psi_{Z'}^H\right)$$

$$= \det\left(I_M + \frac{\sigma_x^2}{\sigma_n^2}\Psi_{Z_1}\Psi_{Z_1}^H\right)\det\left(I_M + \frac{\sigma_x^2}{\sigma_n^2}\Psi_{Z'}\sum_{Z_1}^{-1}\Psi_{Z'}\right) \quad (24)$$

$$\simeq \det\left(I_M + \frac{\sigma_x^2}{\sigma_n^2}\Psi_{Z_1}\Psi_{Z_1}^H\right)\det\left(I_M + \frac{\sigma_x^2}{\sigma_n^2}\Psi_Z\Psi_{Z'}^H\right) \quad (25)$$

$$= \det(\sum_{Z_1})\det(\sum_{Z'}), \quad (26)$$

where in going from equation (24) to equation (25), we used the fact that $\Psi_{Z_1}$ and $\Psi_{Z'}$ are almost orthogonal. Continuing in the same manner, it can be seen that:

$$\det(\sum_Z) \simeq \prod_{i=1}^{C}\det(\sum_{Z_i}). \quad (27)$$

Combining equations (23) and (27), we obtain (up to an irrelevant multiplicative factor):

$$p(y|Z) \simeq \prod_{i=1}^{C} p(y|Z_i). \quad (28)$$

Orthogonality allows us to reach the same conclusion of equation (28) for the non-Gaussian case. Combining equations (18) and (28), we may write:

$$p(Z|y) \simeq \pi_{i=1}^C p(Z_i|y), \quad (29)$$

which applies equally to the Gaussian and non-Gaussian cases.

In evaluating the expectation, we again distinguish between the Gaussian and non-Gaussian cases. The following focusses on the non-Gaussian case for which $\mathbb{E}[x_Z|y] = (\Psi_Z^H \Psi_Z)^{-1}\Psi_Z^H y$. Using the decomposition into semi-orthogonal clusters $\Psi_Z = [\Psi_{Z_1} \Psi_{Z_2} \ldots \Psi_{Z_C}]$, we may write:

$$(\Psi_Z^H \Psi_Z)^{-1}\Psi_Z^H y = \begin{bmatrix} \Psi_{Z_1}^H \Psi_{Z_1} & \Psi_{Z_1}^H \Psi_{Z_2} & \cdots & \Psi_{Z_1}^H \Psi_{Z_C} \\ \vdots & \vdots & \ddots & \vdots \\ \Psi_{Z_C}^H \Psi_{Z_1} & \Psi_{Z_C}^H \Psi_{Z_2} & \cdots & \Psi_{Z_C}^H \Psi_{Z_C} \end{bmatrix}^{-1} \quad (30)$$

$$\begin{bmatrix} \Psi_{Z_1}^H y \\ \vdots \\ \Psi_{Z_C}^H y \end{bmatrix} \simeq \begin{bmatrix} (\Psi_{Z_1}^H \Psi_{Z_1})^{-1}\Psi_{Z_1}^H y \\ \vdots \\ (\Psi_{Z_C}^H \Psi_{Z_C})^{-1}\Psi_{Z_C}^H y \end{bmatrix}; \text{ i.e., } \mathbb{E}[x_Z|y] \simeq \begin{bmatrix} \mathbb{E}[x_{Z_1}|y] \\ \vdots \\ \mathbb{E}[x_{Z_C}|y] \end{bmatrix}.$$

Orthogonality allows us to write an identical expression to equation (30) in the Gaussian case.

In order to see how (semi)orthogonality helps with the MMSE evaluation, we substitute the decomposed expressions of equations (29) and (30) into equation (17) to yield:

$$x_{MMSE} = \sum_{Z \subset \cup S_i} p(Z|y)\mathbb{E}[x|y,Z] \simeq \sum_{Z_i \subset S_i, i=1,\ldots,C} \prod_i p(Z_i|y) \quad (31)$$

$$\begin{bmatrix} \mathbb{E}[x|y,Z_1] \\ \mathbb{E}[x|y,Z_2] \\ \vdots \\ \mathbb{E}[x|y,Z_C] \end{bmatrix} = \begin{bmatrix} \sum_{Z_1 \subset S_1} p(Z_1|y)\mathbb{E}[x|y,Z_1] \\ \sum_{Z_2 \subset S_2} p(Z_2|y)\mathbb{E}[x|y,Z_2] \\ \vdots \\ \sum_{Z_C \subset S_C} p(Z_C|y)\mathbb{E}[x|y,Z_C] \end{bmatrix}$$

where the last line follows from the fact that $\Sigma_Z p(Z_i|y)=1$. Thus, the semi-orthogonality of the columns in the sensing matrix allows us to obtain the MMSE estimate of x in a divide-and-conquer manner by estimating the non-overlapping sections of x independently from each other. Other structural properties of $\Psi$ can be utilized to reduce further the complexity of the MMSE estimation. For example, the orthogonal clusters exhibit some form of similarity and the columns within a particular cluster are also related to each other.

Thus, a method of performing structure-based Bayesian sparse signal reconstruction solving the aforementioned problems is desired.

SUMMARY OF THE INVENTION

The method of performing structure-based Bayesian sparse signal reconstruction is a Bayesian approach to sparse signal recovery that has relatively low complexity and makes collective use of a priori statistical properties of the signal and noise, sparsity information, and the rich structure of the sensing matrix $\Psi$. The method is used with both Gaussian and non-Gaussian (or unknown) priors, and performance measures of the ultimate estimate outputs are easily calculated.

The method of performing structure-based Bayesian sparse signal reconstruction includes the steps of: (a) receiving a signal x; (b) establishing an observation vector y and a sensing matrix $\Psi$ such that $y=\Psi x+n$, where n represents complex additive white Gaussian noise; (c) correlating the observation vector y with columns of the sensing matrix $\Psi$; (d) generating a correlation vector comprised of correlations between the observation vector y with columns of the sensing matrix $\Psi$ above a set threshold value; (e) determining a vector index of the correlation vector with a highest level of correlation and generating a cluster of set length L centered about the vector index with the highest level of correlation; (f) determining a vector index of the correlation vector with the next highest level of correlation and generating a cluster of set length L centered about the vector index with the next highest level of correlation with a correlation above a set correlation threshold $\kappa$; (g) repeating step (f) until all possible correlations with a correlation above the set correlation threshold $\kappa$ are exhausted to form a set of semi-orthogonal clusters; (h) calculating a likelihood of support $|S_i|$ for each of the semi-orthogonal clusters in the range of $|S_i|=1$ to $|S_i|=P_c$, wherein $P_c$ represents a maximum possible support size in the cluster, and $|S_i|$ represents the likelihood support of the i-th cluster; and (i) calculating an estimated signal vector $x_{MMSE}$ as $x_{MMSE}=$ $$\begin{bmatrix} \Sigma_{Z_1 \subset S_1} p(Z_1|y) E[x|y, Z_1] \\ \Sigma_{Z_2 \subset S_2} p(Z_2|y) E[x|y, Z_2] \\ \vdots \\ \Sigma_{Z_C \subset S_C} p(Z_C|y) E[x|y, Z_C] \end{bmatrix},$$

wherein $Z_1 \ldots Z_C$ are a set of dummy variables each ranging through a respective likelihood of support, $E[x|y, Z_1] \ldots E[x|y, Z_C]$ are a set of expected values of the sparse vector x, and $p(Z_1|y) \ldots p(Z_C|y)$ are a set of probable support sizes of the respective semi-orthogonal clusters.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
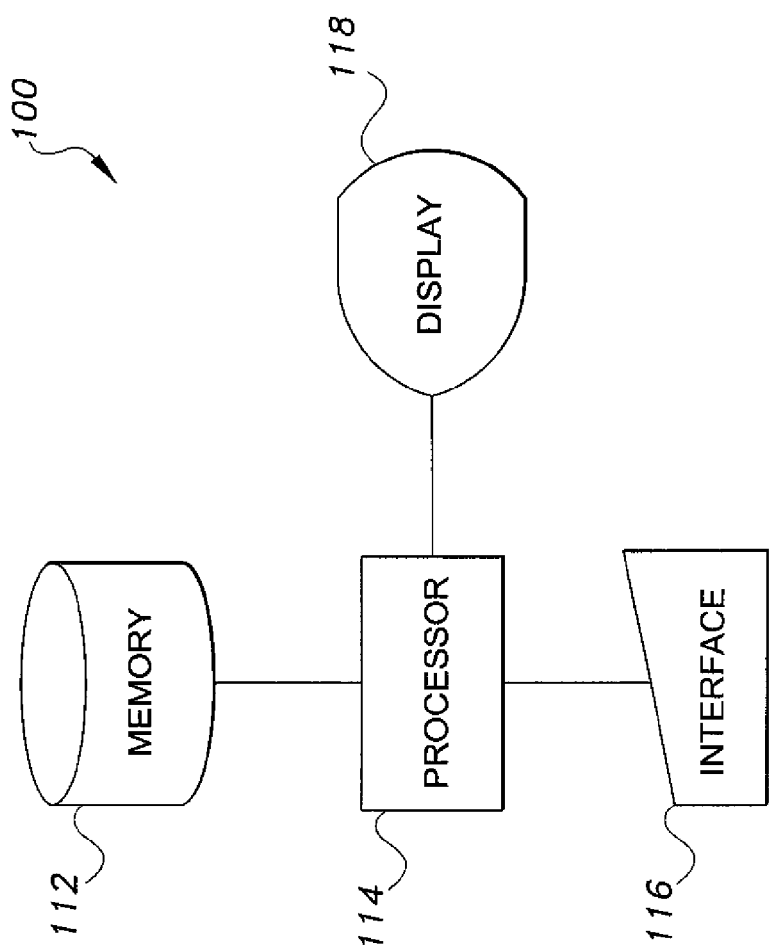
FIG. 1 is a block diagram illustrating system components for implementing a method of performing structure-based Bayesian sparse signal reconstruction according to the present invention.

The method of performing structure-based Bayesian sparse signal reconstruction is based on the CS problem, described by the model of equation (1) above. In the problem, $x \in \mathbb{C}^N$ is a P-sparse signal (i.e., a signal that consists of P non-zero coefficients in an N-dimensional space with P<<N) in some domain, and $y \in \mathbb{C}^M$ is the observation vector with M<<N, such that y=Ψx+n, where Ψ is an M×N measurement/sensing matrix that is assumed to be incoherent with the domain in which x is sparse, and n is complex additive white Gaussian noise, $CN(0, \sigma_n^2 I_M)$. The first step in the method is correlation of the observation vector y with the columns of the sensing matrix Ψ. By retaining correlations that exceed a certain threshold, we can then determine the dominant positions/regions where the support of the sparse vector x is located. The performance of the orthogonal clustering method is dependent on this initial correlation-based estimate or "guess". This step creates a vector of N correlations.

From the vector of N correlations generated in the previous step, the indices with a correlation greater than the threshold κ are then obtained. Since n is complex Gaussian, the value of κ can be easily evaluated such that $p(|n|^2 > \kappa^2) \triangleq p_n$ is very small (where $|n|^2$ is $\chi^2$-distributed with 2N degrees of freedom). If $i_1$ denotes the index with the largest correlation above κ, then a cluster of size L is formed and centered around $i_1$. If $i_2$ denotes the corresponding index of the second largest correlation above κ, then another cluster of size L is formed around $i_2$. If the two formed clusters overlap, then the two clusters are merged into a larger cluster. This procedure is repeated until all of the correlations greater than κ are exhausted. This step forms semi-orthogonal clusters around the positions with correlation values greater than the threshold κ.

Next, each cluster is processed independently, and in each cluster, the likelihoods for supports of size |S|=1, |S|=2, ..., |S|=$P_c$ are calculated for each cluster, where $P_c$ denotes the maximum possible support size in a cluster. In this step, the most probable support of size, |S|=1, |S|=2, ..., |S|=$P_c$, is found by calculating the likelihoods for all supports of size |S| using either equation (11) or equation (12). Each cluster is processed independently by capitalizing on the semi-orthogonality between the clusters. The expected value of the sparse vector x given y and the most probable support for each size can also be evaluated using either equation (6) or equation (8), depending on the a priori statistical information.

Lastly, once the dominant supports for each cluster, their likelihoods, the expected value of x given y and the dominant supports have been found, the MMSE (or MAP) estimates of x can be evaluated, as described above with respect to equation (31). It should be noted that these estimates are approximate, as they are evaluated using only the dominant supports instead of using all supports.

To summarize the above, the method of performing structure-based Bayesian sparse signal reconstruction includes the steps of: (a) receiving a signal x; (b) establishing an observation vector y and a sensing matrix Ψ such that y=Ψx+n, where n represents complex additive white Gaussian noise; (c) correlating the observation vector y with columns of the sensing matrix Ψ; (d) generating a correlation vector comprised of correlations between the observation vector y with columns of the sensing matrix Ψ above a set threshold value; (e) determining a vector index of the correlation vector with a highest level of correlation and generating a cluster of set length L centered about the vector index with the highest level of correlation; (f) determining a vector index of the correlation vector with the next highest level of correlation and generating a cluster of set length L centered about the vector index with the next highest level of correlation with a correlation above a set correlation threshold κ; (g) repeating step (f) until all possible correlations with a correlation above the set correlation threshold κ are exhausted to form a set of semi-orthogonal clusters; (h) calculating a likelihood of support $|S_i|$ for each of the semi-orthogonal clusters in the range of $|S_i|$=1 to $|S_i|$=$P_c$, wherein $P_c$ represents a maximum possible support size in the cluster, and $|S_i|$ represents the likelihood support of the i-th cluster; and (i) calculating an estimated signal vector $x_{MMSE}$ as $$x_{MMSE} = \begin{bmatrix} \Sigma_{Z_1 \subset S_1} p(Z_1 | y) E[x | y, Z_1] \\ \Sigma_{Z_2 \subset S_2} p(Z_2 | y) E[x | y, Z_2] \\ \vdots \\ \Sigma_{Z_C \subset S_C} p(Z_C | y) E[x | y, Z_C] \end{bmatrix},$$

where $Z_1 \ldots Z_C$ are a set of dummy variables each ranging through a respective likelihood of support, E [x|y, $Z_1$] ... E [x|y, $Z_C$] are a set of expected values of the sparse vector x, and p($Z_1$|y) ... p($Z_C$|y) are a set of probable support sizes of the respective semi-orthogonal clusters.

In order to reduce complexity of the MMSE estimation, three different structures of the sensing matrix may be used. The first, as described above, makes use of the orthogonality of the clusters. As will be described below, similarity of clusters and order within a cluster may also be taken advantage of.

With regard to similarity of clusters, calculating the likelihood can be performed in a "divide-and-conquer" manner by calculating the likelihood for each cluster independently. This is a direct consequence of the semi-orthogonal structure of the columns of the sensing matrix. Further, due to the rich structure of the sensing matrix, the clusters formed are quite similar. Below, the structure present in discrete Fourier transform (DFT) and Toeplitz sensing matrices are used to show that the likelihood and expectation expressions in each cluster (for both the Gaussian and non-Gaussian cases) are strongly related, allowing many calculations across clusters to be shared.

For DFT matrices, we let $\psi_1, \psi_2, \ldots, \psi_L$ denote the sensing columns associated with the first cluster. Then, it can be seen that the corresponding columns for the $i^{th}$ cluster of equal length that are $\Delta_i$ columns away are $\psi_1 \odot \psi_{\Delta_i}$, $\psi_2 \odot \psi_{\Delta_i}, \ldots, \psi_L \odot \psi_{66_i}$, where $\psi_{\Delta_i}$ is some constant vector that depends on the sensing columns. Assuming that we evaluate the likelihood p($Z_1$|y) and expectation E [x|y, $Z_1$] for a set of columns $Z_1$ in the first cluster, then, for this set, the assumption can be made that:

$$y = \Psi_{Z_i} x + n. \quad (32)$$

Letting $Z_i$ denote the same set of columns chosen from the $i^{th}$ cluster that is $\Delta_i$ columns away (in other words, $Z_i = Z_1 + \Delta_i$), then, for this set, it may be assumed that:

$$y = \Psi_{Z_i} x + n. \quad (33)$$

Using Hadamard multiplication by $\psi^*_{\Delta_i}$ on both sides of equation (33) yields:

$$y \odot \psi^*_{\Delta_i} = \Psi_{Z_1} x + n \odot \psi^*_{\Delta_i}. \quad (34)$$

It should be noted that equations (32) and (34) have the same sensing matrix and the same noise statistics (n is a white circularly symmetric Gaussian and, thus, is invariant to multiplication by $\psi^*_{\Delta_i}$). The only difference is that y is modulated by the vector $\psi^*_{\Delta_i}$ in moving from the first to the $i^{th}$ cluster. This allows us to write:

$$p(Z_i|y) = p(Z_1|y \odot \psi^*_{\Delta_i})$$

and $$E[x|y, Z_i] = E[x|y \odot \psi^*_{\Delta_i}, Z_1], \quad (35)$$

which is valid for both the Gaussian and non-Gaussian cases. In other words, if $Z_i$ is obtained from $Z_1$ by a constant shift, then any y-independent calculations remain the same while any calculations involving y are obtained by modulating y by the vector $\psi^*_{\Delta_i}$. For example, the likelihood in the Gaussian case is given by:

$$p(y|Z_i) = \frac{\exp\left(-\|y\|^2_{\Sigma_{Z_i}^{-1}}\right)}{\det(\Sigma_{Z_i})} = \frac{\exp\left(-\|y \odot \psi^*_{\Delta_i}\|^2_{\Sigma_{Z_1}^{-1}}\right)}{\det(\Sigma_{Z_1})} \quad (36)$$

and, in the non-Gaussian case, it is given by:

$$p(y|Z_i) \simeq \exp\left(-\|y\|^2_{P_{Z_i}^{\perp}}\right) = \exp\left(-\|y \odot \psi^*_{\Delta_i}\|^2_{P_{Z_1}^{\perp}}\right). \quad (37)$$

Similar behavior is seen in calculation of the expectation. Thus, in the Gaussian case, we have:

$$E[x|y, Z_i] = \sigma_x^2 \Psi_{Z_i}^H \Sigma_{Z_i}^{-1} y = \sigma_x^2 \Psi_{Z_1}^H \Sigma_{Z_1}^{-1}(y \odot \psi^*_{\Delta_i}) \quad (38)$$

and in the non-Gaussian case, we have:

$$E[x|y, Z_i] = (\Psi_{Z_i}^H \Psi_{Z_i})^{-1} \Psi_{Z_i}^H y \quad (39)$$
$$= (\Psi_{Z_1}^H \Psi_{Z_1})^{-1} \Psi_{Z_1}^H (y \odot \psi^*_{\Delta_i}).$$

In the Toeplitz or block Toeplitz case, the sensing matrix reads $\Psi = [\Psi_{S_1} \Psi_{S_2} \ldots \Psi_{S_C}]$. The clusters can be modified to make sure that they are identical (by stretching their end points if necessary) such that $\Psi_{S_i} = [O \ldots O \Theta^T O \ldots O]^T$. In other words, the $\Psi_{S_i}$s are simply shifted versions of each other. We may now calculate the quantities det $$\det(\Sigma_{Z_1}), \|y\|^2_{\Sigma_{Z_1}^{-1}}, \text{ and } \|y\|^1_{P_{Z_1}^{\perp}}$$

for a set $Z_1$ of columns of the first cluster. Then, an identical set of columns $Z_i$ are chosen in the $i^{th}$ cluster. From this:

$$\det(\Sigma_{Z_i}) = \det(\Sigma_{Z_1}); \quad (40)$$
$$\|y\|^2_{\Sigma_{Z_i}^{-1}} = \|y \odot w_i\|^2_{\Sigma_{Z_1}^{-1}}; \text{ and}$$

where $w_i$ is a rectangular window corresponding to the location of the non-zero rows of $\Psi_{S_i}$.

With regard to the approach of taking advantage of order within a cluster, in order to evaluate the likelihood for supports of size $i = 1, 2, \ldots, P_c$ in a single cluster, an order-recursive approach is used. In this approach, the likelihood and expectation for supports of size $i+1$ are calculated by updating calculations made for supports of size $i$. In the following, it is assumed that we have calculated the likelihood and expectation involving the columns $\Psi_S$ which we would like to update to $\Psi_{S'} = [\Psi_S \psi_i]$.

For the case where $x|S$ is Gaussian, to calculate the likelihood $$L_{S'} = \frac{\exp\left(-\frac{1}{\sigma_n^2}\|y\|^2_{\Sigma_{S'}^{-1}}\right)}{\det(\Sigma_{S'})}$$

with $$\Sigma_{S'} = I_M + \frac{\sigma_x^2}{\sigma_n^2} \Psi_{S'} \Psi_{S'}^H, \text{ it should be noted that}$$

$$\Sigma_{S'} = \Sigma_S + \frac{\sigma_x^2}{\sigma_n^2} \psi_i \psi_i^H$$

or, by the matrix inversion lemma:

$$\Sigma_{S'}^{-1} = \Sigma_S^{-1} - \frac{\sigma_x^2}{\sigma_n^2} \xi_i \omega_i \omega_i^H, \quad (41)$$

where $$\omega_i \triangleq \Sigma_S^{-1} \psi_i \quad (42)$$

$$\xi_i \triangleq \left(1 + \frac{\sigma_x^2}{\sigma_n^2} \psi_i^H \Sigma_S^{-1} \psi_i\right)^{-1} = \left(1 + \frac{\sigma_x^2}{\sigma_n^2} \psi_i^H \omega_i\right)^{-1}. \quad (43)$$

Ultimately, we are interested in computing exp $$\left(-\frac{1}{\sigma_n^2}\|y\|^2_{\Sigma_{S'}^{-1}}\right).$$

Thus, using equation (41), we obtain:

$$\exp\left(-\frac{1}{\sigma_n^2}\|y\|^2_{\Sigma_{S'}^{-1}}\right) = \exp\left(-\frac{1}{\sigma_n^2}\|y\|^2_{\Sigma_S^{-1}} + \frac{\sigma_x^2 \xi_i}{\sigma_n^4}\|\omega_i^H y\|^2\right) \quad (44)$$
$$= \exp\left(-\frac{1}{\sigma_n^2}\|y\|^2_{\Sigma_S^{-1}}\right) \exp\left(\frac{\sigma_x^2 \xi_i}{\sigma_n^4}\|\omega_i^H y\|^2\right).$$

The determinant of $\Sigma_{S'}$ can be evaluated as follows:

$$\det(\Sigma_{S'}) = \det\left(\Sigma_S + \frac{\sigma_x^2}{\sigma_n^2} \psi_i \psi_i^H\right) \quad (45)$$
$$= \det\left(1 + \frac{\sigma_x^2}{\sigma_n^2} \psi_i^H \Sigma_S^{-1} \psi_i\right)$$
$$\det(\Sigma_S) = \xi_i^{-1} \det(\Sigma_S).$$

Thus, the likelihood for the support of size S' can be written as (using equations (44) and (45)):

$$L_{S'} = \frac{\exp\left(-\frac{1}{\sigma_n^2}\|y\|^2_{\Sigma_S^{-1}}\right)\exp\left(\frac{\sigma_x^2 \xi_i}{\sigma_n^4}\|\omega_i^H y\|^2\right)}{\det(\Sigma_S)\xi_i^{-1}} \quad (46)$$
$$= L_S \underbrace{\xi_i \exp\left(\frac{\sigma_x^2 \xi_i}{\sigma_n^4}\|\omega_i^H y\|^2\right)}_{\delta_i}.$$

The above shows that in order to calculate $L_{S'}$, we need to compute only $\omega_i$ and $\xi_i$, which constitute $\delta_i$. To calculate $\omega_i$ for a cluster of length L, $O(LM^2)$ operations are required if standard matrix multiplication is used. This complexity can be reduced to $O(LM)$ by storing all the past computed values of $\omega$ and $\xi$ using the structure of $\Sigma_S$.

Similarly, $E[x_{S'}|y]$ can be calculated in an order-recursive manner as follows:

$$E[x_{S'}|y] = \begin{bmatrix} E[x_S|y] \\ \sigma_x^2 \omega_i^H y \end{bmatrix}. \quad (47)$$

In the case where x|S is unknown, then in order to calculate the likelihood in the non-Gaussian case, we need to evaluate the norm expressed by $$\|y\|^2_{P^\perp_{S'}} = \|y\|^2 - y^H \Psi_{S'} (\Psi^H_{S'} \Psi_{S'})^{-1} \Psi^H_{S'} y.$$

The approach relies on calculating the inverse $\Lambda_{S'} \triangleq (\Psi^H_{S'} \Psi_{S'})^{-1}$ recursively. This is implemented by invoking the block inversion formula:

$$\Lambda_{S'} = \begin{bmatrix} \Lambda_S + \frac{1}{\xi_i} \omega_i \omega_i^H & -\frac{1}{\xi_i} \omega_i \\ -\frac{1}{\xi_i} \omega_i^H & \frac{1}{\xi_i} \end{bmatrix} \quad (48)$$

where $$\omega_i \triangleq \Lambda_S (\Psi^H_S \psi_i); \quad (49)$$

$$\xi_i \triangleq \|\psi_i\|^2 - (\psi_i^H \Psi_S) \Lambda_S (\Psi^H_S \psi_i) = \|\psi_i\|^2 - \omega_i^H \eta_i, \quad (50)$$

with the elements of $\eta_i \triangleq \Psi^H_S \psi_i$ all available (i.e., they are calculated initially and can be reused afterwards). Using this recursion, we can construct a recursion for the projected norm $L_{S'}$:

$$L_{S'} = \exp\left(-\frac{1}{\sigma_n^2} [\|y\|^2 - y^H \Psi_{S'} \Lambda_{S'} \Psi^H_{S'} y]\right) \quad (51)$$

$$= \exp\left(-\frac{1}{\sigma_n^2} [\|y\|^2 - y^H \Psi_S \Lambda_S \Psi^H_S y]\right) \exp\left(-\frac{1}{\sigma_n^2}\left[-\frac{1}{\xi_i} |(y^H \Psi_S) \omega_i|^2 + \frac{2}{\xi_i} \text{Re}\{(y^H \psi_i) \omega_i^H (\Psi^H_S y)\} - \frac{1}{\xi_i} |y^H \psi_i|^2\right]\right)$$

$$= L_S \underbrace{\exp\left(\frac{1}{\sigma_n^2 \xi_i} [|(y^H \Psi_S) \omega_i|^2 - 2\text{Re}\{(y^H \psi_i) \omega_i^H (\Psi^H_S y)\} + |y^H \psi_i|^2]\right)}_{\delta_i}$$

Similarly, it can be seen that:

$$\mathbb{E}[x_{S'} | y] = \Lambda_{S'} (\Psi^H_{S'} y) \quad (52)$$

$$= \begin{bmatrix} \mathbb{E}[x_S | y] + \frac{1}{\xi_i} \omega_i \eta_i^H \mathbb{E}[x_S | y] - \frac{1}{\xi_i} \omega_i \psi_i^H y \\ -\frac{1}{\xi_i} \eta_i^H \mathbb{E}[x_S | y] + \frac{1}{\xi_i} \psi_i^H y \end{bmatrix}.$$

The cluster independent and cluster-wise evaluations in the recursive procedure for both the cases (x|S being either Gaussian or unknown) are summarized below in Table 2:

TABLE 2

Cluster-independent and Cluster-wise Evaluations in the Recursive Procedure for Complexity Reduction Within a Cluster

| | Cluster Independent Evaluations | Cluster-wise Evaluations |
|---|---|---|
| x|S is Gaussian | Evaluate $\omega_i$ and $\xi_i$ using (42) and (43) <br> Update $\Sigma_S^{-1}$ using (41) <br> Update det $(\Sigma_S)$ using (45) | Evaluate $\|\omega_i^H y\|^2$ <br> Update $L_S$ using (46) <br> Update $\mathbb{E}[x_S|y]$ using (47) |
| x|S is unknown | Initialize: Calculate $\psi_i^H \psi_j \ \forall \ i, j$ <br> Evaluate $\omega_i$ using (49) <br> Update $\Sigma_S$ using (48) and (50) | Initialize: Evaluate $y^H \psi_i \ \forall \ i$ <br> Update $L_S$ using (51) <br> Update $\mathbb{E}[x_S|y]$ using (52) |

It should be understood that the calculations may be performed by any suitable computer system, such as that diagrammatically shown in the FIG. 1. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Simulations were performed to compare the performance of the present method against known prior sparse reconstruction methods, including the convex relaxation (CR) method, the orthogonal matching pursuit (OMP) method, and the fast Bayesian matching pursuit (FBMP) method. The parameters that used in all the simulations were N=800, $$M = \frac{N}{4} = 200, \ p = 10^{-2},$$

and SNR=30 dB (unless stated otherwise). Cases where the sensing matrix is a DFT or a Toeplitz matrix were both simulated. In the Figures, the present orthogonal clustering-based method is represented as "OC".

Figure 2:
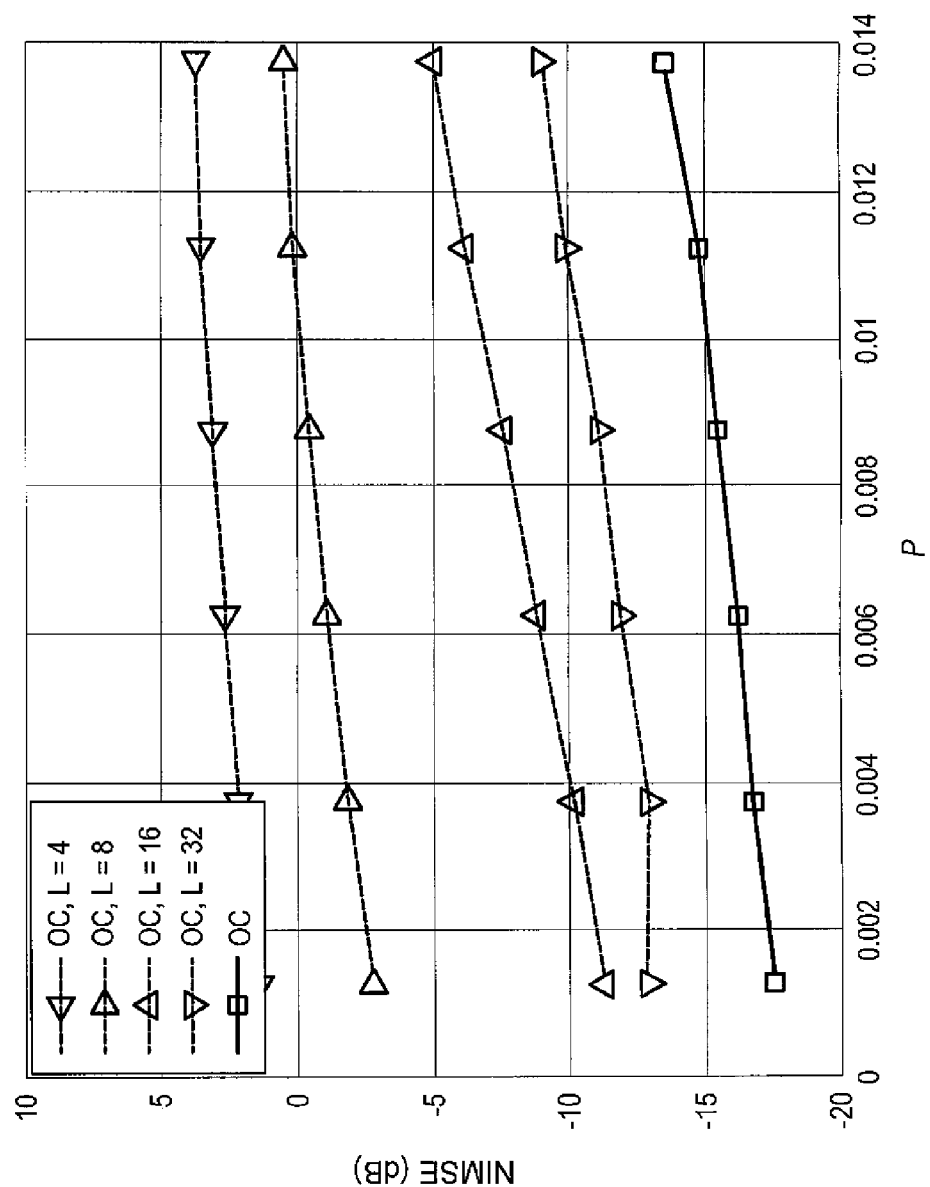
FIG. 2 is a graph illustrating normalized mean-square error (NMSE) for varying cluster lengths compared against success probability in the method of performing structure-based Bayesian sparse signal reconstruction according to the present invention.

FIG. 2 compares the normalized mean-square error (NMSE) of the present method as the cluster length L is varied. The NMSE is defined as $$NMSE = \frac{1}{R}\Sigma_{r=1}^{R} \frac{\|x^{(r)} - \hat{x}^{(r)}\|^2}{\|x^{(r)}\|^2},$$

where x represents the estimated sparse signal for realization r, and R is the total number of runs. For this case, the DFT matrix is used as the sensing matrix with x|S being Gaussian. It should be noted that while implementing the present method with fixed-length clusters, overlapping of clusters is not allowed to maintain orthogonality. This results in an increase in the probability of missing the correct support if two supports are close to each other. Thus, the smaller the cluster, the greater the probability of missing the correct supports. This can be clearly seen in FIG. 2 as performance of the present method improves by increasing L. This improvement in performance, though, is obtained at the expense of speed.

Figure 3:
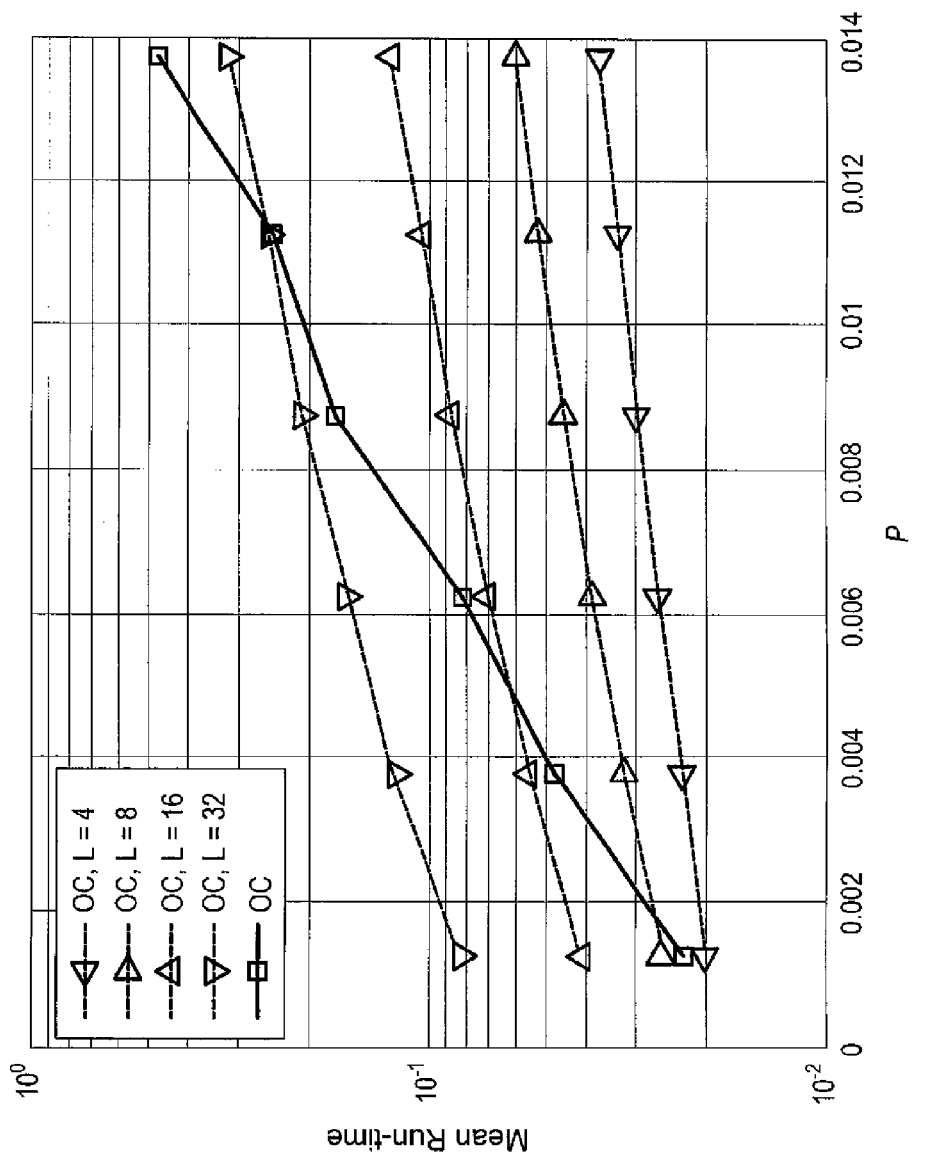
FIG. 3 is a graph illustrating mean run time for varying cluster lengths compared against success probability in the method of performing structure-based Bayesian sparse signal reconstruction according to the present invention.

FIG. 3 shows that the smaller the length of clusters, the faster the algorithm. It should be noted that for larger values of L (e.g., L>32), it might not be possible to form the required number of non-overlapping clusters. To overcome this problem, the performance of OC implemented with variable length clusters is shown in FIG. 2. In this case, the overlapping clusters are joined together to form larger clusters. It can be seen in FIG. 2 that the performance of OC with variable-length clusters is better than the case when it is implemented with fixed-length clusters. Moreover, this performance is achieved with a reasonable run-time, as shown in FIG. 3.

Figure 4:
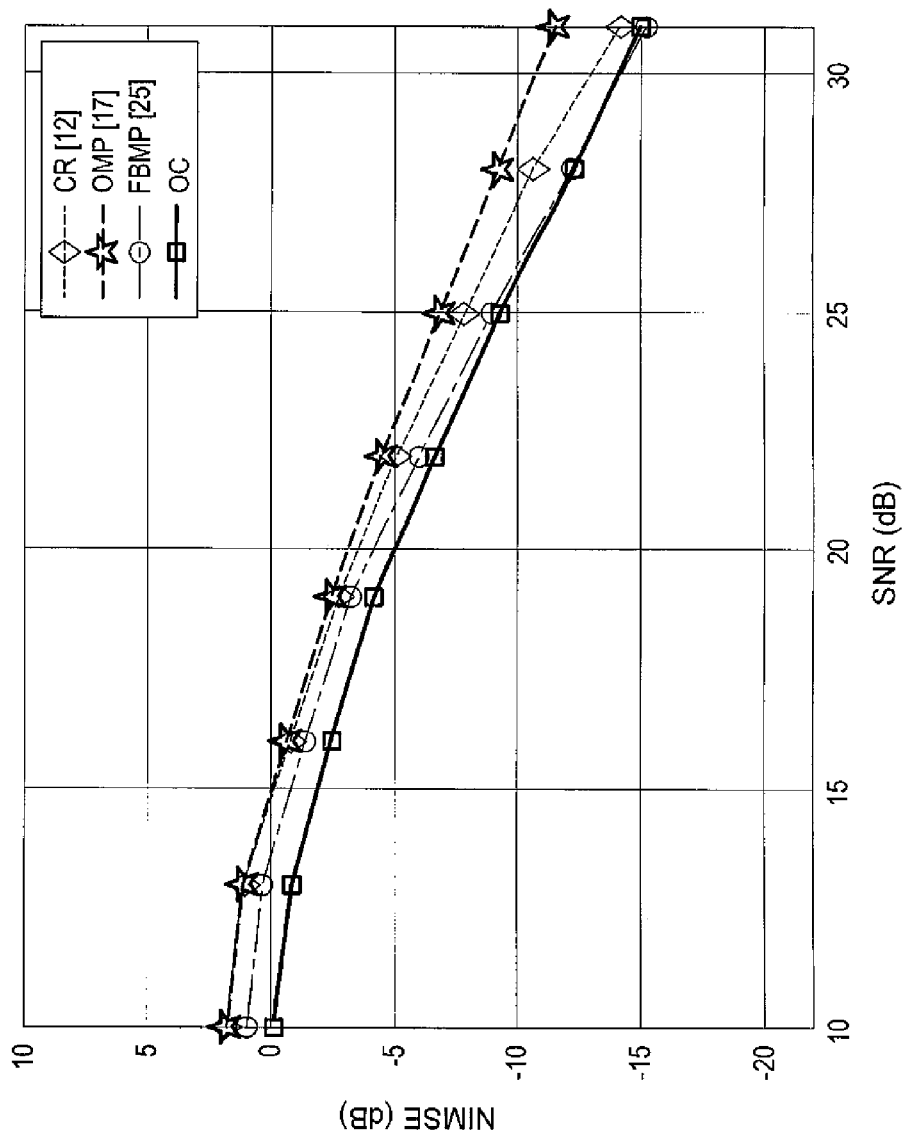
FIG. 4 is a graph comparing normalized mean-square error (NMSE) against signal-to-noise ratio for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is Gaussian.

FIG. 4 compares the performance of the algorithms for the case where the sensing matrix is a DFT matrix and x|S is Gaussian. In the FBMP implementation, the number of greedy branches to explore (D) is set to 10. It should be noted that OC outperforms all other algorithms at low SNR, while FBMP performs quite close to it at SNR≥25 dB. Overall, the present method outperforms both OMP and CR at all SNR values. Specifically, at SNR=25 dB, the present method has a gain of approximately 2 dB and 3 dB over CR and OMP, respectively.

Figure 5:
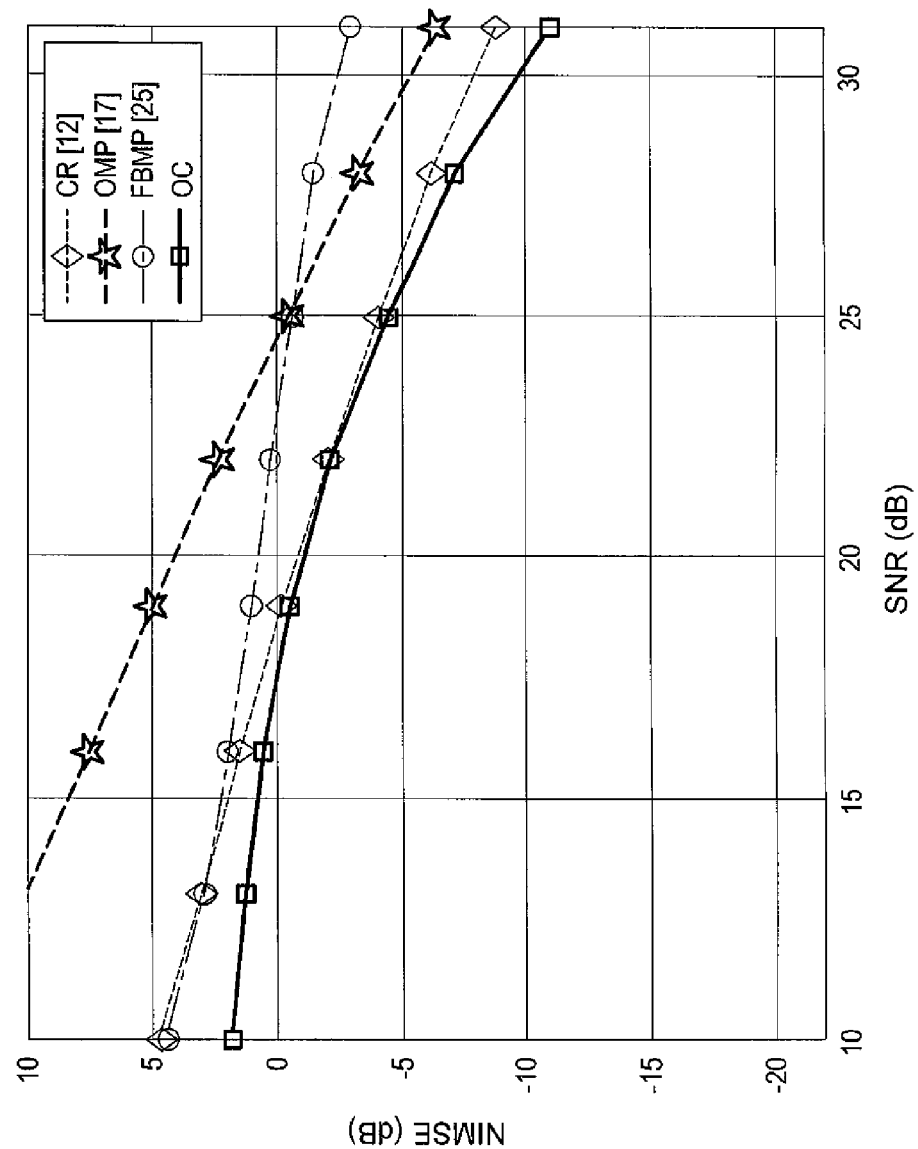
FIG. 5 is a graph comparing normalized mean-square error (NMSE) against signal-to-noise ratio for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is unknown.

The performance of the algorithms for the case where the sensing matrix is a DFT matrix and x|S is unknown is shown in FIG. 5. In this case, the entries of $x_G$ are drawn from a uniform distribution. Here, FBMP is allowed to estimate the hyper-parameters using its approximate ML algorithm (with E set to 10). It can be seen that the present method (OC) easily outperforms OMP and FBMP, while CR performs similarly to OC. Specifically, at SNR=25 dB, OC outperforms OMP and FBMP by approximately 5 dB.

Figure 6:
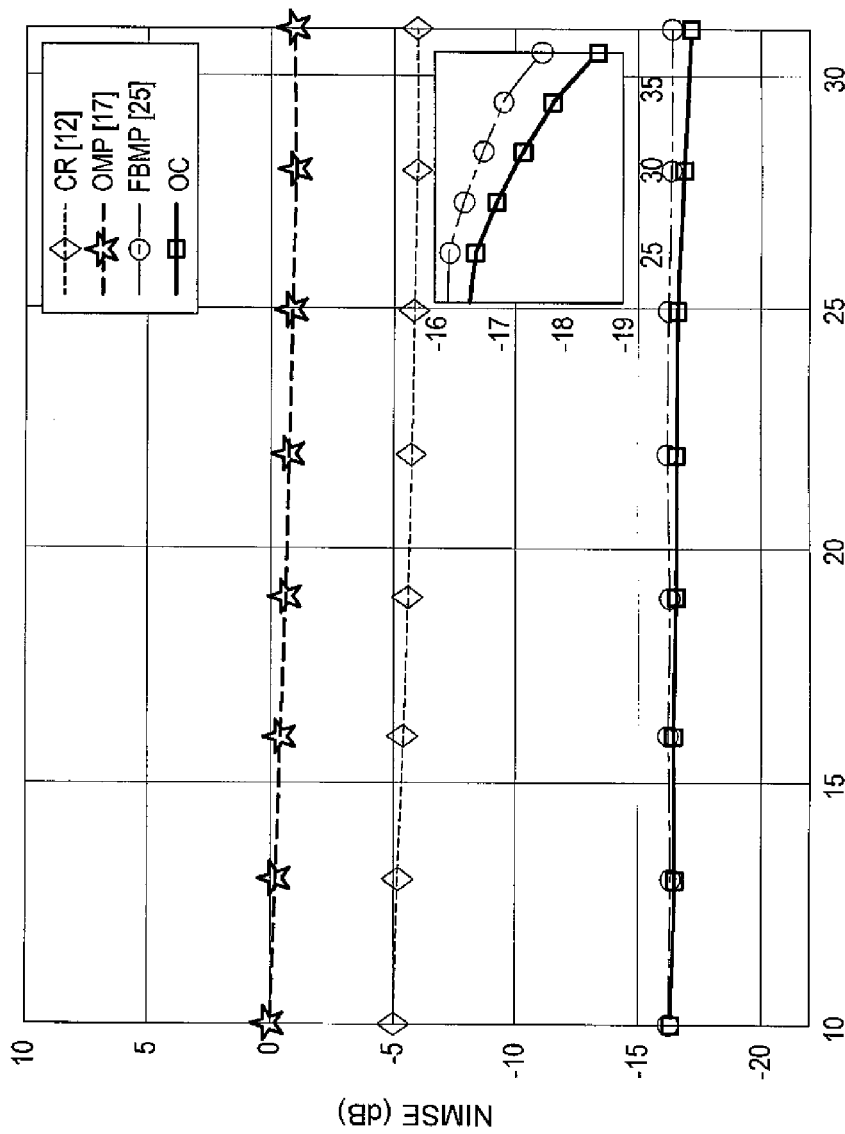
FIG. 6 is a graph comparing normalized mean-square error (NMSE) against signal-to-noise ratio for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a Toeplitz matrix and x|S is Gaussian.

FIG. 6 compares the performance of the algorithms for the case where the sensing matrix is Toeplitz. To do so, a Toeplitz matrix was first generated from a column having 20 non-zero consecutive samples drawn from a Gaussian distribution. The sensing matrix was then extracted by uniformly sub-sampling this full matrix at a rate less than the duration of the signal. It should be noted that the performance of OC and FBMP are almost the same at low SNR, but OC outperforms FBMP in the high SNR region. OMP and CR do not perform well in this case, as the sensing matrix does not exhibit the requisite incoherence conditions (in this case, $\mu(\Psi) \simeq 0.9$) on which much of the CS theory is based.

Figure 7:
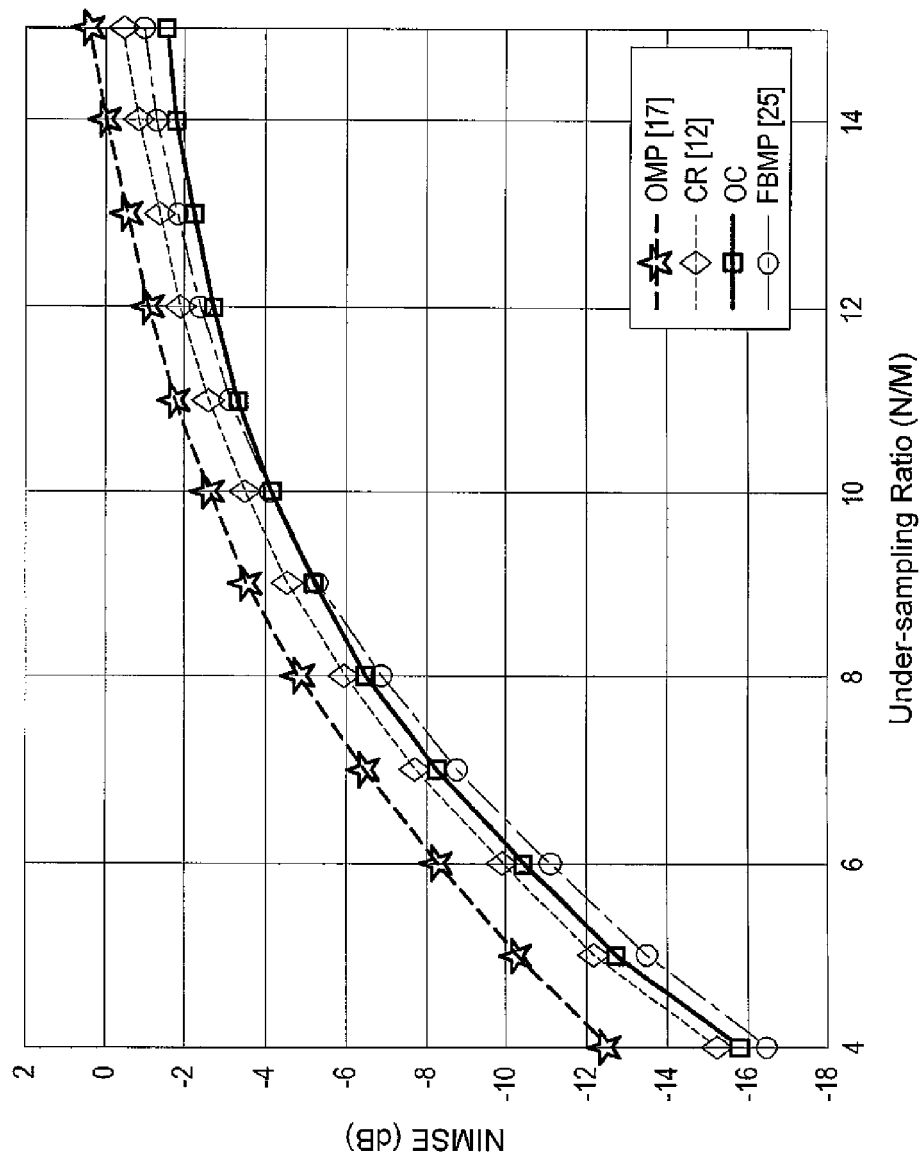
FIG. 7 is a graph comparing normalized mean-square error (NMSE) against under-sampling ratio for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is Gaussian.

FIG. 7 shows the performance of the algorithms (for the case where the sensing matrix is DFT and x|S is Gaussian) when the under-sampling ratio (N/M) is varied. It can be seen that the performance of all the algorithms deteriorates as (N/M) increases. The present method and FBMP perform quite close to each other with the present method performing slightly better at high (N/M) ratios.

Figure 8:
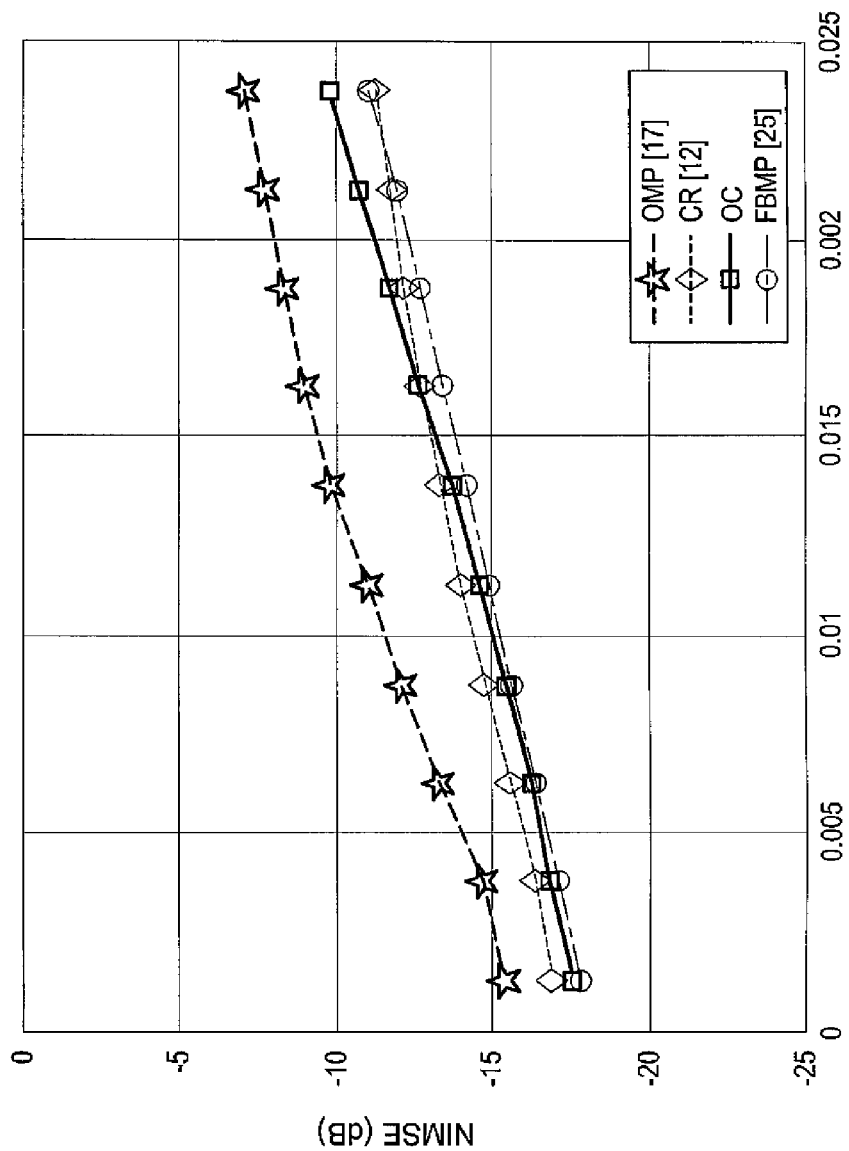
FIG. 8 is a graph comparing normalized mean-square error (NMSE) against success probability for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is Gaussian.

FIG. 8 compares the performance of the algorithms when the sparsity rate p is varied (for the case where the sensing matrix is DFT and x|S is Gaussian). It can be seen that the performance of OC is quite close to CR and FBMP at low sparsity rate, while it outperforms OMP by approximately 3 dB for the studied range of p. The performance of OC deteriorates at the high sparsity rate because the number of clusters increases as p increases and the probability of clusters to be near or overlapping each other increases. Thus, in this case, the orthogonality assumption of OC becomes weak.

Figure 9:
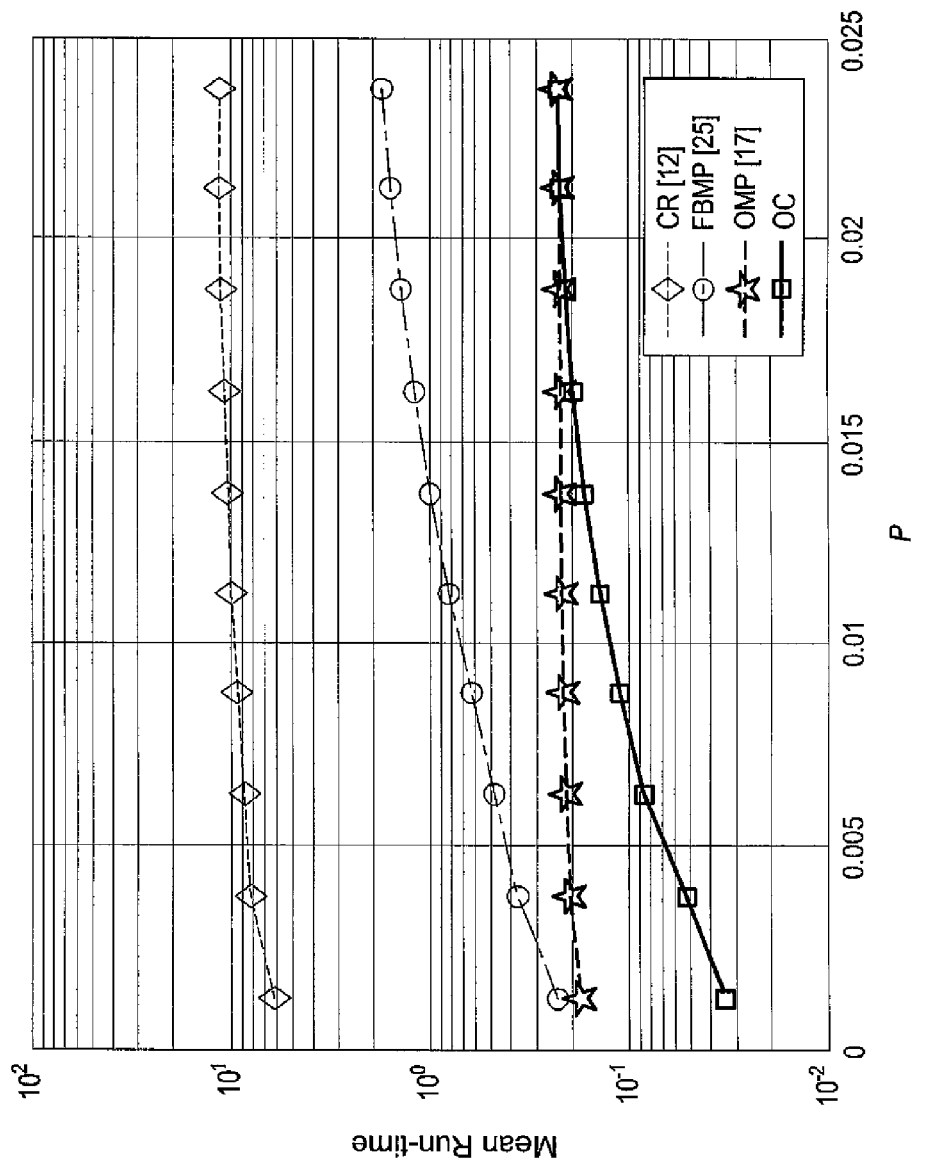
FIG. 9 is a graph comparing mean run time against success probability for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is Gaussian.
Figure 10:
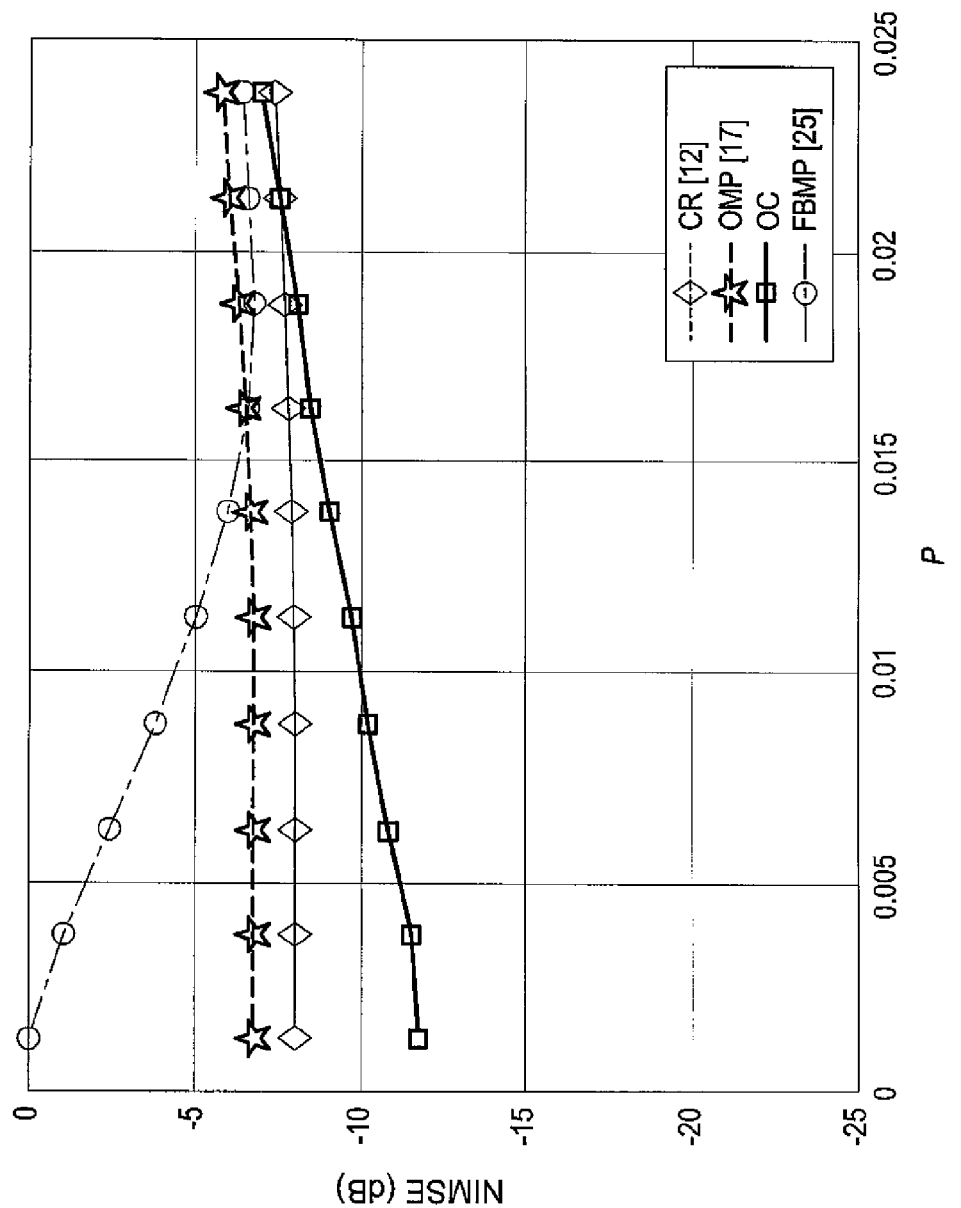
FIG. 10 is a graph comparing normalized mean-square error (NMSE) against success probability for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a discrete Fourier transform (DFT) matrix and x|S is unknown.
Figure 11:
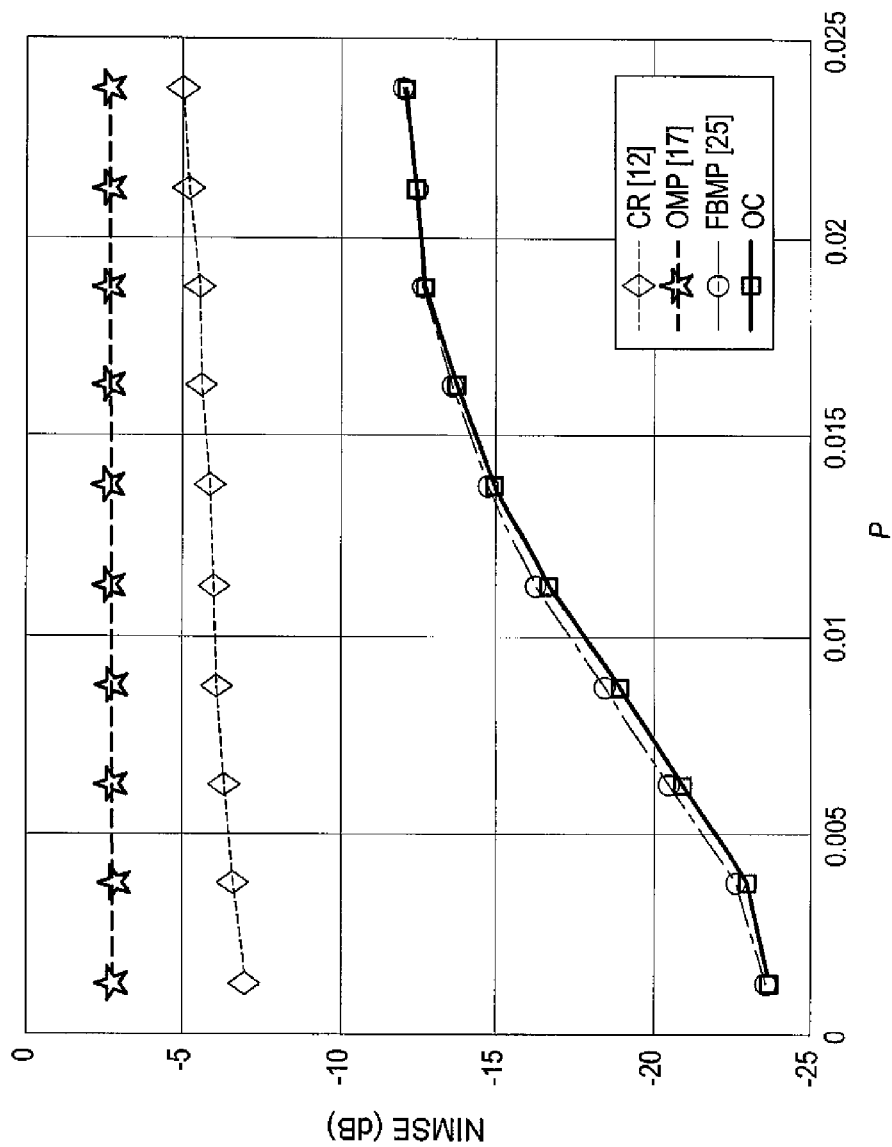
FIG. 11 is a graph comparing normalized mean-square error (NMSE) against success probability for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a Toeplitz matrix and x|S is Gaussian.
Figure 12:
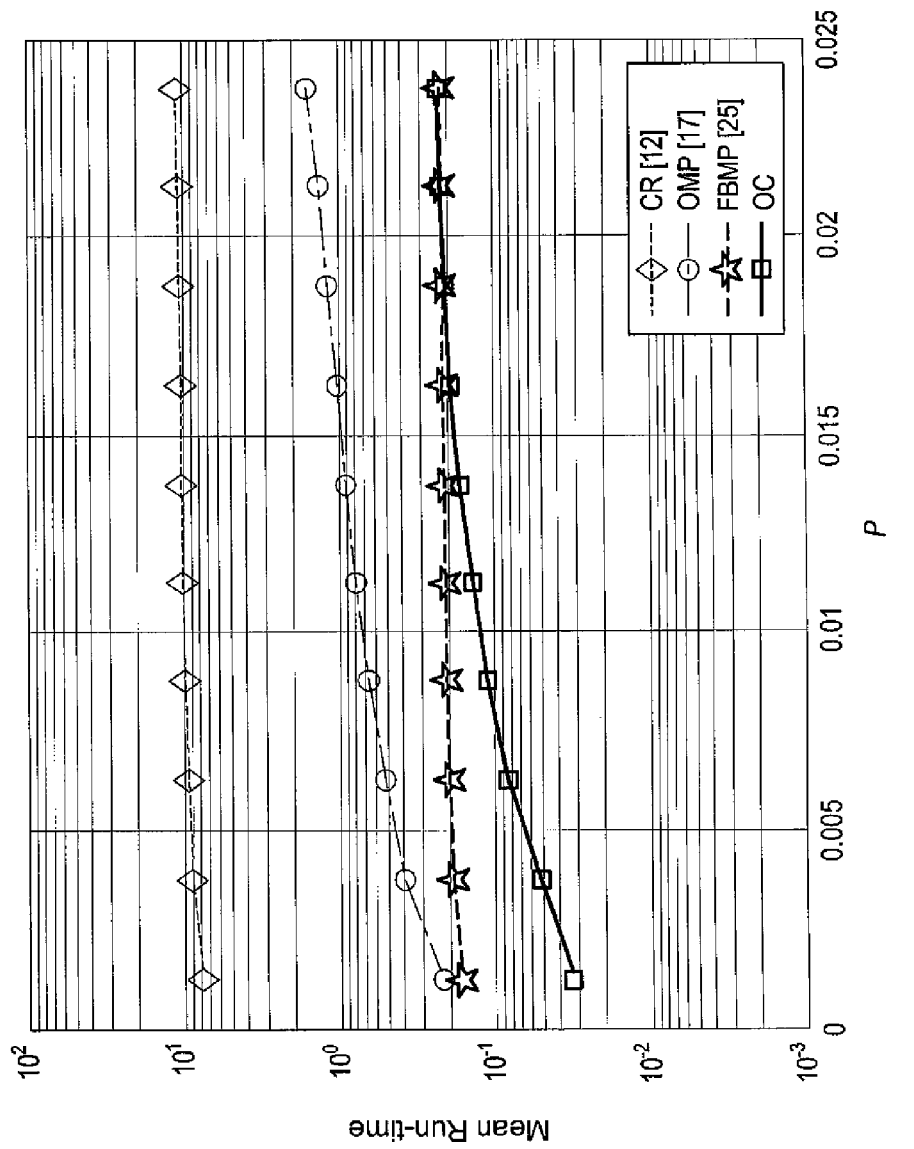
FIG. 12 is a graph comparing mean run time against success probability for the present method of performing structure-based Bayesian sparse signal reconstruction compared against the prior convex relaxation (CR) method, the orthogonal matching pursuit (OMP) method, and the fast Bayesian matching pursuit (FBMP) method for a sensing matrix which is a Toeplitz matrix and x|S is Gaussian.

FIG. 9 compares the mean run-time of all of the algorithms. It can be seen that OC is faster than all other algorithms. As sparsity rate increases, the length of the clusters increases, and thus the complexity of OC. FIG. 10 shows that OC performs quite well at the low sparsity rate in the case where the sensing matrix is DFT and x|S is unknown. FBMP does not perform well at the low sparsity rate in this case even with its approximate ML algorithm. The run-time of FBMP is also higher, as compared to FIG. 8, due to the time taken to estimate the hyper-parameters using the ML algorithm. In the case of the Toeplitz matrix (shown in FIG. 11), the performance of OC and FBMP is almost the same, while the performance of CR and OMP is quite poor due to the weak incoherence of the sensing matrix. It can also be observed from FIG. 12 that OC is quite fast compared to the other algorithms.

It is to be understood that the present invention is not limited to the embodiments described above, but encompasses any and all embodiments within the scope of the following claims.

We claim:

1. A method of performing structure-based Bayesian sparse signal reconstruction, comprising the steps of:
   (a) receiving a signal x;
   (b) establishing an observation vector y and a sensing matrix Ψ such that y=Ψx+n, where n represents complex additive white Gaussian noise;
   (c) correlating the observation vector y with columns of the sensing matrix Ψ;
   (d) generating a correlation vector comprised of correlations between the observation vector y with columns of the sensing matrix Ψ above a set threshold value;
   (e) determining a vector index of the correlation vector with a highest level of correlation and generating a cluster of set length L centered about the vector index with the highest level of correlation;
   (f) determining a vector index of the correlation vector with the next highest level of correlation and generating a cluster of set length L centered about the vector index with the next highest level of correlation with a correlation above a set correlation threshold κ;
   (g) repeating step (f) until all possible correlations with a correlation above the set correlation threshold κ are exhausted to form a set of semi-orthogonal clusters;
   (h) calculating a likelihood of support $|S_i|$ for each of the semi-orthogonal clusters in the range of $|S_i|=1$ to $|S_i|=P_c$, wherein $P_c$ represents a maximum possible support size in the cluster, and $|S_i|$ represents the likelihood support of the i-th cluster; and (i) calculating an estimated signal vector $x_{MMSE}$ as:

$$x_{MMSE} = \begin{bmatrix} \Sigma_{Z_1 \subset S_1} p(Z_1|y) \mathbb{E}[x|y, Z_1] \\ \Sigma_{Z_2 \subset S_2} p(Z_2|y) \mathbb{E}[x|y, Z_2] \\ \vdots \\ \Sigma_{Z_C \subset S_C} p(Z_C|y) \mathbb{E}[x|y, Z_C] \end{bmatrix},$$

wherein $Z_1 \ldots Z_C$ are a set of dummy variables (each ranging through a respective likelihood of support), $\mathbb{E}[x|y, Z_1] \ldots \mathbb{E}[x|y, Z_C]$ are a set of expected values of the sparse vector x, and $p(Z_1|y) \ldots p(Z_C|y)$ are a set of probable support sizes of the respective semi-orthogonal clusters.

2. The method of performing structure-based Bayesian sparse signal reconstruction as recited in claim 1, wherein the expected value for each of the $Z_i = Z_1 \ldots Z_C$ are calculated as $\mathbb{E}[x_{S|y, Z_i}] = \sigma_x^2 \Psi_{Si}^H \Sigma_{Si}^{-1} y$, wherein $$\Sigma_{Si} = I_M + \frac{\sigma_x^2}{\sigma_n^2} \Psi_{Si} \Psi_{Si}^H, I_M$$

represents an identity matrix, and x conditioned on its support is Gaussian.

3. The method of performing structure-based Bayesian sparse signal reconstruction as recited in claim 1, wherein the expected value for each of the $Z_i = Z_1 \ldots Z_C$ are calculated as $\mathbb{E}[x_S|y, Z_i] = (\Psi_{Si}^H \Psi_{Si})^{-1} \Psi_{Si}^H y$, wherein x conditioned on its support is non-Gaussian.

4. The method of performing structure-based Bayesian sparse signal reconstruction as recited in claim 2, wherein the probable support sizes for each of the $Z_i = Z_1 \ldots Z_C$ are calculated as $$p(Z_i|y) = \frac{\exp\left(-\frac{1}{\sigma_n^2} \|y\|_{\Sigma_{Si}^{-1}}^2\right)}{\det(\Sigma_{Si})}.$$

5. The method of performing structure-based Bayesian sparse signal reconstruction as recited in claim 3, wherein the probable support sizes for each of the $Z_i = Z_1 \ldots Z_C$ are calculated as $$p(Z_i|y) = \exp\left(-\frac{1}{\sigma_n^2} \|P_S^\perp y\|^2\right),$$

wherein $P_S^\perp = I - \Psi_S(\Psi_S^H \Psi_S)^{-1} \Psi_S^H$, where I is an identity matrix.

6. A computer software product that includes a non-transitory storage medium readable by a processor, the non-transitory storage medium having stored thereon a set of instructions for performing structure-based Bayesian sparse signal reconstruction, the instructions comprising:

(a) a first set of instructions which, when loaded into main memory and executed by the processor, causes the processor to receive a signal x and store the signal in the non-transitory storage medium;

(b) a second set of instructions which, when loaded into main memory and executed by the processor, causes the processor to establish an observation vector y and a sensing matrix $\Psi$ such that $y = \Psi x + n$, where n represents complex additive white Gaussian noise;

(c) a third set of instructions which, when loaded into main memory and executed by the processor, causes the processor to correlate the observation vector y with columns of the sensing matrix $\Psi$;

(d) a fourth set of instructions which, when loaded into main memory and executed by the processor, causes the processor to generate a correlation vector comprised of correlations between the observation vector y with columns of the sensing matrix $\Psi$ above a set threshold value;

(e) a fifth set of instructions which, when loaded into main memory and executed by the processor, causes the processor to determine a vector index of the correlation vector with a highest level of correlation and generating a cluster of set length L centered about the vector index with the highest level of correlation;

(f) a sixth set of instructions which, when loaded into main memory and executed by the processor, causes the processor to determining a vector index of the correlation vector with the next highest level of correlation and generating a cluster of set length L centered about the vector index with the next highest level of correlation with a correlation above a set correlation threshold $\kappa$;

(g) a seventh set of instructions which, when loaded into main memory and executed by the processor, causes the processor to repeat the sixth set of instructions until all possible correlations with a correlation above the set correlation threshold $\kappa$ are exhausted to form a set of semi-orthogonal clusters;

(h) an eighth set of instructions which, when loaded into main memory and executed by the processor, causes the processor to calculate a likelihood of support $|S_i|$ for each of the semi-orthogonal clusters in the range of $|S_i|=1$ to $|S_i|=P_c$, wherein $P_c$ represents a maximum possible support size in the cluster, and $|S_i|$ represents the likelihood support of the i-th cluster; and (i) a ninth set of instructions which, when loaded into main memory and executed by the processor, causes the processor to calculate an estimated signal vector $$x_{MMSE} \text{ as } x_{MMSE} = \begin{bmatrix} \Sigma_{Z_1 \subset S_1} p(Z_1|y) \mathbb{E}[x|y, Z_1] \\ \Sigma_{Z_2 \subset S_2} p(Z_2|y) \mathbb{E}[x|y, Z_2] \\ \vdots \\ \Sigma_{Z_C \subset S_C} p(Z_C|y) \mathbb{E}[x|y, Z_C] \end{bmatrix},$$

wherein $Z_1 \ldots Z_C$ are a set of dummy variables each ranging through a respective likelihood of support, $\mathbb{E}[x|y, Z_1] \ldots \mathbb{E}[x|y, Z_C]$ are a set of expected values of the sparse vector x, and $p(Z_1|y) \ldots p(Z_C|y)$ are a set of probable support sizes of the respective semi-orthogonal clusters.

7. The computer software product as recited in claim 6, wherein the expected value for each of the $Z_i = Z_1 \ldots Z_C$ are calculated as $\mathbb{E}[x_{S|y, Z_i}] = \sigma_x^2 \Psi_{Si}^H \Sigma_{Si}^{-1} y$, wherein $$\Sigma_{Si} = I_M + \frac{\sigma_x^2}{\sigma_n^2} \Psi_{Si} \Psi_{Si}^H,$$

$I_M$ represents an identity matrix, and x conditioned on its support is Gaussian.

8. The computer software product as recited in claim 7, wherein the probable support sizes for each of the $Z_i = Z_1 \ldots Z_C$ are calculated as $$p(Z_i | y) = \frac{\exp\left(-\frac{1}{\sigma_n^2}\|y\|^2_{\Sigma_{Si}^{-1}}\right)}{\det(\Sigma_{Si})}.$$

9. The computer software product as recited in claim 6, wherein the expected value for each of the $Z_i = Z_1 \ldots Z_C$ are calculated as $\mathbb{E}[x_S|y, Z_i] = (\Psi_{Si}^H \Psi_{Si})^{-1} \Psi_{Si}^H y$, wherein x conditioned on its support is non-Gaussian.

10. The computer software product as recited in claim 9, wherein the probable support sizes for each of the $Z_i = Z_1 \ldots Z_C$ are calculated as $$p(Z_i | y) = \exp\left(-\frac{1}{\sigma_n^2}\|P_S^\perp y\|^2\right),$$

wherein $P_S^\perp = I - \Psi_S(\Psi_S^H \Psi_S)^{-1} \Psi_S^H$, where I is an identity matrix.

* * * * *